(12) United States Patent
Islam et al.

(10) Patent No.: US 12,273,875 B2
(45) Date of Patent: Apr. 8, 2025

(54) SYSTEM AND METHOD OF DOWNLINK CONTROL CHANNEL SIGNALING FOR UPLINK COEXISTENCE OF MULTIPLE SERVICE TYPES

(71) Applicant: Apple Inc., Cupertino, CA (US)

(72) Inventors: Toufiqul Islam, Santa Clara, CA (US); Debdeep Chatterjee, San Jose, CA (US); Sergey Panteleev, Nizhny Novgorod (RU); Fatemeh Hamidi-Sepehr, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 274 days.

(21) Appl. No.: 17/440,909

(22) PCT Filed: Apr. 2, 2020

(86) PCT No.: PCT/US2020/026357
§ 371 (c)(1),
(2) Date: Sep. 20, 2021

(87) PCT Pub. No.: WO2020/206099
PCT Pub. Date: Oct. 8, 2020

(65) Prior Publication Data
US 2022/0159683 A1 May 19, 2022

Related U.S. Application Data

(60) Provisional application No. 62/828,383, filed on Apr. 2, 2019.

(51) Int. Cl.
*H04W 72/23* (2023.01)
*H04W 72/1268* (2023.01)

(52) U.S. Cl.
CPC ....... *H04W 72/1268* (2013.01); *H04W 72/23* (2023.01)

(58) Field of Classification Search
CPC ... H04L 1/0061; H04L 5/0051; H04L 5/0053; H04W 72/0446; H04W 72/0453; H04W 72/21; H04W 72/53; H04W 72/1263
(Continued)

(56) References Cited

U.S. PATENT DOCUMENTS

| 2018/0070341 A1 | 3/2018 | Islam et al. |
| 2018/0167916 A1 | 6/2018 | Zhang et al. |

(Continued)

FOREIGN PATENT DOCUMENTS

| CN | 101884179 | 11/2010 |
| CN | 102598810 | 7/2012 |

(Continued)

OTHER PUBLICATIONS

[No Author Listed], "3rd Generation Partnership Project; Technical Specification Group Radio Access Network; NR; Physical layer procedures for data (Release 15)," 3GPP TS 38.214, V15.5.0, Mar. 2019, 103 pages.

(Continued)

*Primary Examiner* — Harun Chowdhury
(74) *Attorney, Agent, or Firm* — Fish & Richardson P.C.

(57) ABSTRACT

In an example computer-implemented method, a user equipment (UE) receives first configuration data including an indication of a search space set for monitoring a wireless network for an uplink cancellation command, and second configuration including an indication to activate monitoring of the wireless network for an uplink cancellation command. The UE further receives a first physical downlink control channel (PDCCH) including scheduling information for an uplink transmission. The UE monitors the wireless communications network for the uplink cancellation command in accordance with the search space set, and receives a second PDCCH from the wireless including the uplink cancellation (Continued)

command, where the uplink cancellation command includes an indication to cancel a first portion of the uplink transmission. The UE cancels a transmission of the first portion of the uplink transmission.

17 Claims, 16 Drawing Sheets

(58) Field of Classification Search
USPC .......................................... 370/252, 328, 329
See application file for complete search history.

(56) References Cited

U.S. PATENT DOCUMENTS

| | | | |
|---|---|---|---|
| 2018/0270800 | A1 | 9/2018 | Park et al. |
| 2020/0344747 | A1* | 10/2020 | Park ...................... H04W 72/21 |
| 2020/0351897 | A1 | 11/2020 | Fakoorian et al. |
| 2020/0359447 | A1 | 11/2020 | Yang et al. |
| 2021/0014866 | A1* | 1/2021 | Shi ......................... H04W 72/53 |
| 2021/0345366 | A1* | 11/2021 | Ying ................... H04W 72/0453 |
| 2022/0159701 | A1 | 5/2022 | Islam et al. |
| 2022/0386243 | A1 | 12/2022 | Liang |

FOREIGN PATENT DOCUMENTS

| | | |
|---|---|---|
| CN | 107926037 | 4/2018 |
| CN | 108633072 | 10/2018 |
| EP | 3621377 | 3/2020 |
| EP | 4181605 | 5/2023 |
| WO | WO 2018/203389 | 11/2018 |

OTHER PUBLICATIONS

Ericsson, "On Pre-emption in Uplink, " 3GPP TSG-RAN WG1 Meeting #92b, R1-1803922, Sanya, P.R. China, Apr. 16-20, 2018, 5 pages.
International Preliminary Report on Patentability in International Appln. No. PCT/US2020/026357, mailed Oct. 14, 2021, 14 pages.
International Search Report and Written Opinions in International Appln. No. PCT/US2020/026357, mailed on Sep. 17, 2020, 22 pages.
Invitation to Pay Additional Fees in International Appln. No. PCT/US2020/026357, mailed on Jul. 27, 2020, 18 pages.
Potevio, "Discussion on UL pre-emption for URLLC reliability," 3GPP TSG RAN WG1 Meeting #93, R1-1807228, May 21-25, 2018, Busan, Korea, 3 pages.
Qualcomm, "UL inter UE Tx prioritization/multiplexing," 3GPP TSG-RAN WG1 #94, R1-1809458, Aug. 20-24, 2018, Gothenburg, Sweden, 12 pages.
Samsung, "Uplink inter UE multiplexing/prioritization for enhanced URLLC," 3 GPP TSG RAN WG1 Meeting #94bis, R1-1810880, Oct. 8-12, 2018, Chegdu, China.
Spreadtrum Communications, "Discussion on UL inter UE Tx prioritization/multiplexing," 3GPP TSG RAN WG1 Meeting #95, R1-1813063, Nov. 12-16, 2018, Spokane, USA, 4 pages.
Vivo, "Summary #3 of UL inter UE Tx prioritization/multiplexing," 3GPP TSG RAN WG1 Meeting 1901, R1-1901457, Jan. 21-25, 2019, Taipei, Taiwan.
Vivo, "Summary of UL inter UE Tx prioritization/multiplexing;" 3GPP TSG RAN WG1 Meeting #96, R1-1903401, Feb. 25-Mar. 1, 2019, Athens, Greece, 48 pages.
Fujitsu, "Discussion on UL cancellation indication," 3GPP TSG RAN WG1 #97, R1-1906585, Reno, USA, May 13-17, 2019, 4 pages.
Samsung, "Multiplexing of UL Transmissions with Different Reliability Requirements," 3GPP TSG RAN WG1 Meeting #92bis, R1-1804392, Sanya, China, Apr. 16-20, 2018, 4 pages.
Vivo, "UL inter-UE Tx prioritization for URLLC," 3GPP TSG RAN WG1 #97, R1-1906150, Reno, USA, May 13-17, 2019, 13 pages.

* cited by examiner

SYSTEM AND METHOD OF DOWNLINK CONTROL CHANNEL SIGNALING FOR UPLINK COEXISTENCE OF MULTIPLE SERVICE TYPES

CLAIM OF PRIORITY

This is the U.S. National Phase Application under 35 U.S.C. § 371 of International Patent Application No. PCT/US2020/026357 filed Apr. 2, 2020, which claims priority under 35 U.S.C. § 119 (e) to U.S. Patent Application Ser. No. 62/828,383, filed on Apr. 2, 2019, the disclosures of each of which are incorporated herein by reference in their entirety.

TECHNICAL FIELD

This disclosure relates generally to wireless communications networks, such as cellular networks. More specifically, this disclosure relates to techniques for controlling the transmission of data on a wireless communications network.

BACKGROUND

Wireless communication systems are rapidly growing in usage. Further, wireless communication technology has evolved from voice-only communications to also include the transmission of data, such as Internet and multimedia content, to a variety of devices.

SUMMARY

In an aspect, a computer-implemented method includes receiving, by a user equipment (UE), first configuration data via a wireless communications network, the first configuration data including an indication of a search space set for monitoring the wireless communications network for an uplink cancellation command; receiving, by the UE, second configuration data via the wireless communications network, the second configuration data including an indication to activate monitoring of the wireless communications network for the uplink cancellation command; receiving, by the UE, a first physical downlink control channel (PDCCH) from the wireless communications network, the first PDCCH including scheduling information for an uplink transmission from the UE to the wireless communications network; monitoring, by the UE, the wireless communications network for the uplink cancellation command in accordance with the search space set; receiving, by the UE, a second PDCCH from the wireless communications network, the second PDCCH including the uplink cancellation command, the uplink cancellation command including an indication to cancel a first portion of the uplink transmission; and cancelling, by the UE, a transmission of the first portion of the uplink transmission to the wireless communications network.

Implementations of this aspect can include one or more of the following features.

In some implementations, the UE can receive the first configuration data via radio resource control (RRC) signaling.

In some implementations, the indication of the search space set can include at least one of an indication of a duration for monitoring the PDCCH for the uplink cancellation command, an indication of a monitoring offset to a start position of the duration, an indication of a periodicity for monitoring the PDCCH for the uplink cancellation command, or an indication of a monitoring pattern.

In some implementations, the UE can receive the second configuration data via radio resource control (RRC) signaling.

In some implementations, the monitoring of the wireless communications network can be performed subsequent to the receipt of the first PDCCH.

In some implementations, the first PDCCH and second PDCCH can be received according to a common downlink control information (DCI) format.

In another aspect, a computer-implemented method includes receiving, by a user equipment (UE), a first uplink (UL) grant from a wireless communications network, where the first UL grant includes a first indication that the UE has been granted permission to transmit a first physical uplink shared channel (PUSCH), first scheduling information for transmitting the first PUSCH, and a first indication of a hybrid automatic repeat request (HARQ) process identifier (PID) for transmitting the first PUSCH; subsequent to receiving the first UL grant, receiving, by the UE, a second UL grant from the wireless communications network, where the second UL grant includes a second indication of the HARQ PID; and responsive to receiving the second UL, cancelling, by the UE, transmission of the PUSCH according to the first UL grant.

Implementations of this aspect can include one or more of the following features.

In some implementations, the method can further include transmitting the first PUSCH according to the second UL grant.

In some implementations, the second UL grant can include an uplink shared channel (UL-SCH) indicator bit and a channel state information (CSI) request, where a value of the UL-SCH indicator bit is zero, and where the CSI request is a sequence of zero bits.

In some implementations, the UE can refrain from transmitting the first PSUCH according to the second UL grant.

In another aspect, a computer-implemented method includes receiving, by a user equipment (UE), a first uplink (UL) grant from a wireless communications network, where the first UL grant includes a first indication that the UE has been granted permission to transmit a first physical uplink shared channel (PUSCH), first scheduling information for transmitting the first PUSCH, a first indication of a hybrid automatic repeat request (HARQ) process identifier (PID) for transmitting the first PUSCH, and an indication of a first uplink resource for transmitting the first PSUCH; prior to or during the first uplink resource, receiving, by the UE, a second UL grant from the wireless communications network, where the second UL grant includes a second indication of the HARQ PID; and responsive to receiving the second UL, cancelling, by the UE, transmission of the first PUSCH according to the first UL grant.

Implementations of this aspect can include one or more of the following features.

In some implementations, the second UL grant can further include an indication of a second uplink resource, and the method can further include transmitting, by the UE, the first PUSCH using the second uplink resource.

In some implementations, the method can further include refraining from transmitting the first PSUCH according to the second UL grant.

In some implementations, the first PUSCH can include HARQ feedback information associated with the HARQ PID.

In some implementations, the first uplink resource can be a Fifth Generation (5G) new radio (NR) resource in accordance with 3rd Generation Partnership Project (3GPP) technical standards.

In some implementations, the HARQ PID can be associated with a downlink transmission performing according to Fifth Generation (5G) new radio (NR) 3rd Generation Partnership Project (3GPP) technical standards.

Other implementations are directed to systems, devices, and non-transitory, computer-readable media having instructions stored thereon, that when executed by one or more processors, cause the one or more processors to perform operations described herein.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

At least some wireless communications systems (e.g., systems implemented using the 3rd Generation Partnership Project (3GPP) Fifth Generation (5G) New Radio (NR) radio access technology) support the coexistence of diverse services and traffic communication in a common carrier. As different services may have different requirements and characteristics, multiplexing techniques may be used to facilitate the efficient and reliable transmission of packets on a wireless recommunication network.

This disclosure describes uplink (UL) multiplexing of transmissions with different reliability and/or latency requirements. As an example, this disclosure describes how one or more indications of impacted resources can be conveyed to one or more user equipment (UE) so that ongoing or imminent UL transmission can be adjusted in order to avoid adversely impacting other UL transmission that may occur in shared resources. As another example, transmission of one service type may be more urgent than the other, and may be prioritized over other ongoing transmissions.

A system (e.g., the systems described in relation to FIGS. 1-11, below) can be configured to implement one or more of these embodiments either individually or in any combination. These embodiments are subsequently described in greater detail with respect to FIGS. 12-14.

Figure 1:
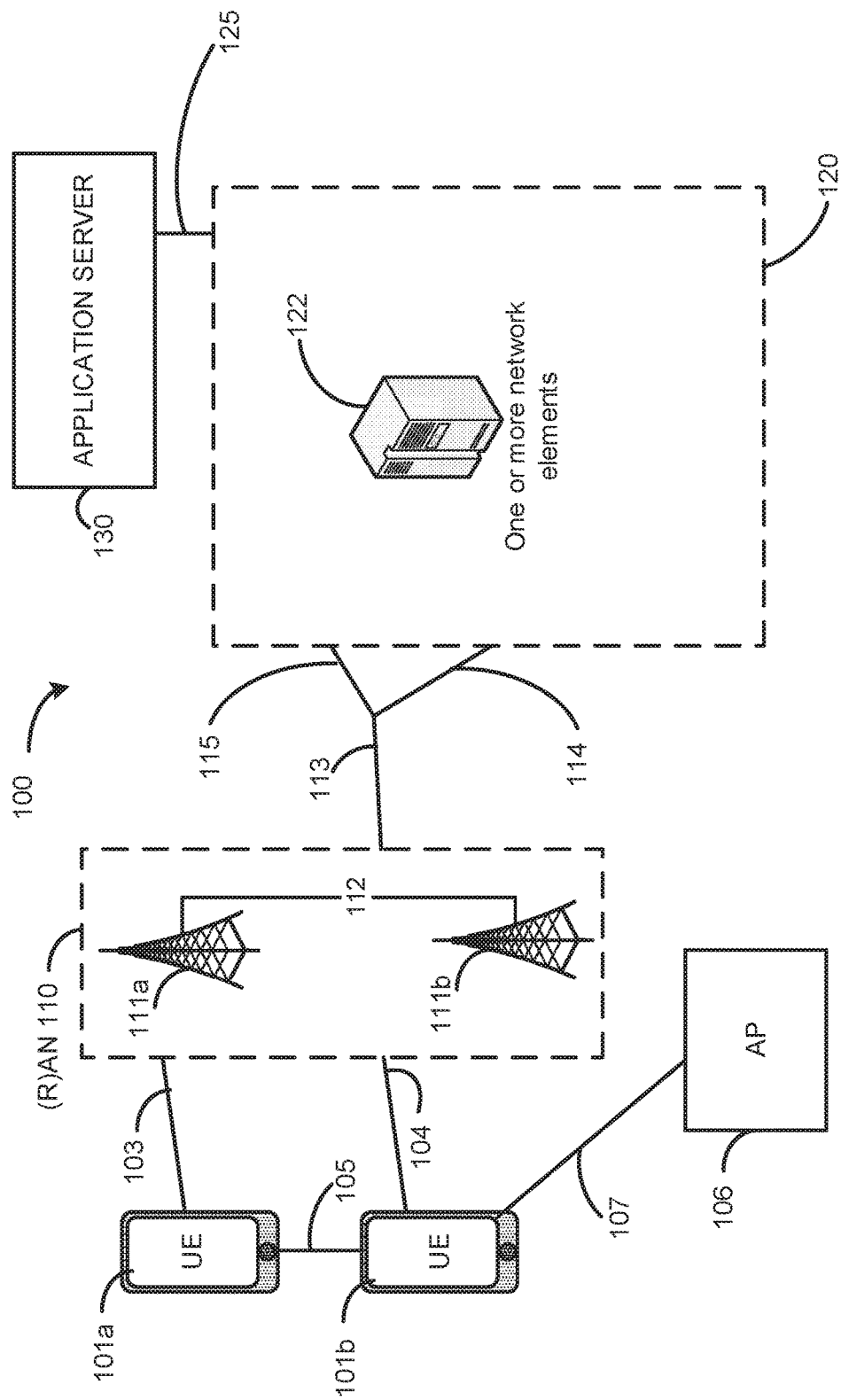
FIG. 1 is a block diagram illustrating an example wireless communication system.

FIG. 1 illustrates an example architecture of a system 100 of a network, in accordance with various embodiments. The following description is provided for an example system 100 that operates in conjunction with the long-term evolution (LTE) system standards and 5th generation (5G) or new radio (NR) system standards as provided by third generation partnership project (3GPP) technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an instrument cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, internet of things (IoT) devices, and/or the like.

In some embodiments, any of the UEs 101 may be IoT UEs, which may comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), ProSe or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with a radio access network (RAN) 110. In embodiments, the RAN 110 may be a next-generation RAN or a 5G RAN, an E-UTRAN, or a legacy RAN, such as an evolved universal-terrestrial RAN (UTRAN) or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 320 of FIG. 3) via an NG interface (discussed infra).

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101*b* within a cell) may be performed at any of the RAN nodes 111 based on channel quality information fed back from any of the UEs

101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

The RAN nodes 111 may be configured to communicate with one another via interface 112. In embodiments where the system 100 is an LTE system (e.g., when CN 120 is an EPC 220 as in FIG. 2), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is a 5GC 320 as in FIG. 3), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Embodiments where the CN 120 is a 5GC 120 are discussed in more detail with regard to FIG. 3.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
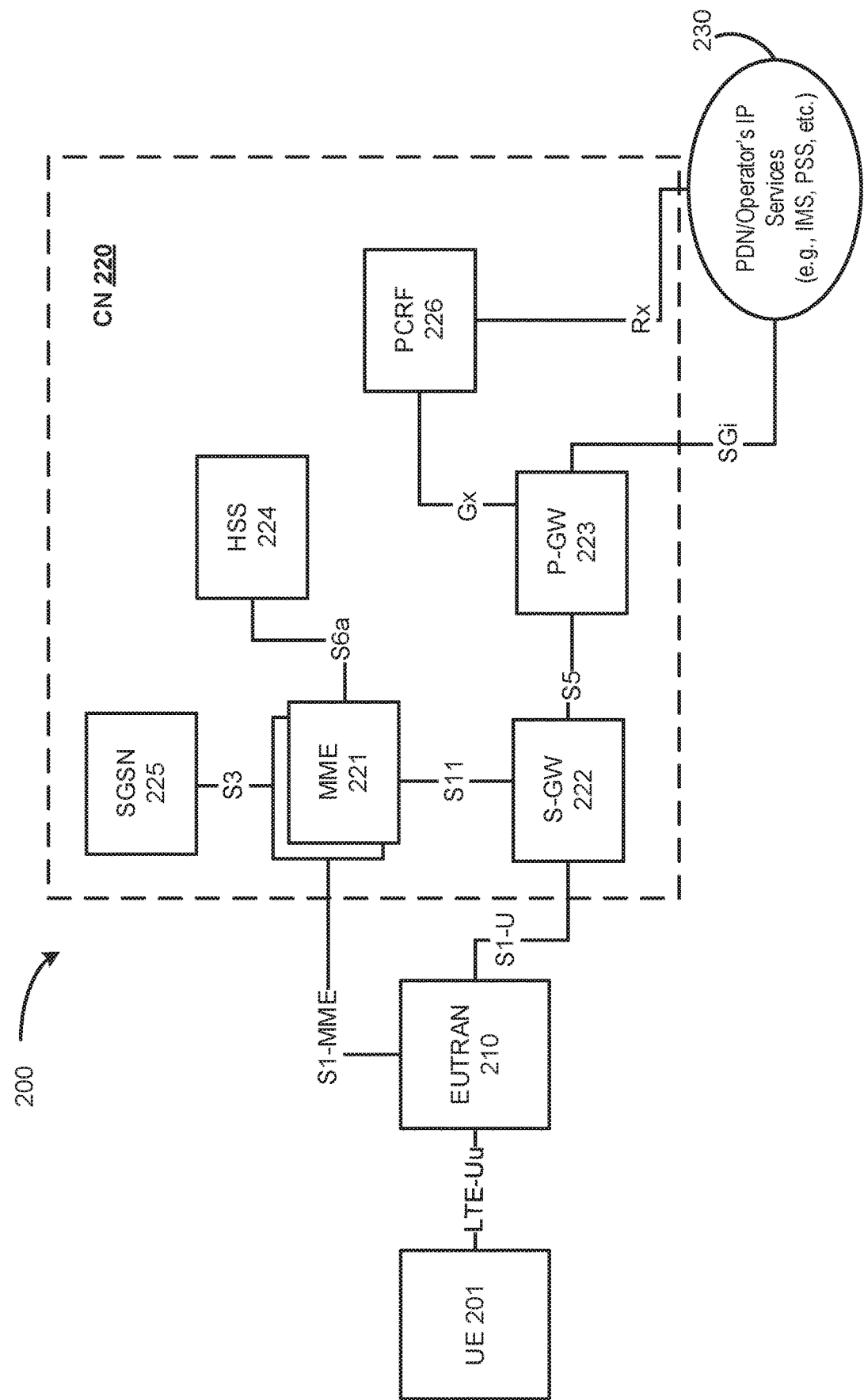
FIGS. 2-3 is a block diagram illustrating an example architecture of a system including a core network.

FIG. 2 illustrates an example architecture of a system 200 including a first CN 220, in accordance with various embodiments. In this example, system 200 may implement the LTE standard wherein the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may comprise MMEs 221, an S-GW 222, a P-GW 223, a HSS 224, and a SGSN 225.

The MMEs 221 may be similar in function to the control plane of legacy SGSN, and may implement MM functions to keep track of the current location of a UE 201. The MMEs 221 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 201, provide user identity confidentiality, and/or perform other like services to users/subscribers. Each UE 201 and the MME 221 may include an MM or EMM sublayer, and an MM context may be established in the UE 201 and the MME 221 when an attach procedure is successfully completed. The MM context may be a data structure or database object that stores MM-related information of the UE 201. The MMEs 221 may be coupled with the HSS 224 via an S6a reference point, coupled with the SGSN 225 via an S3 reference point, and coupled with the S-GW 222 via an S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network. The S3 reference point between the MMEs 221 and the SGSN 225 may enable user and bearer information exchange for inter-3GPP access network mobility in idle and/or active states.

The HSS 224 may comprise a database for network users, including subscription-related information to support the network entities' handling of communication sessions. The EPC 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc. An S6a reference point between the HSS 224 and the MMEs 221 may enable transfer of subscription and authentication data for authenticating/authorizing user access to the EPC 220 between HSS 224 and the MMEs 221.

The S-GW 222 may terminate the S1 interface 113 ("S1-U" in FIG. 2) toward the RAN 210, and routes data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 via an S5 reference point.

The P-GW 223 may terminate an SGi interface toward a PDN 230. The P-GW 223 may route data packets between the EPC 220 and external networks such as a network including the application server 130 (alternatively referred to as an "AF") via an IP interface 125 (see e.g., FIG. 1). In embodiments, the P-GW 223 may be communicatively coupled to an application server (application server 130 of FIG. 1 or PDN 230 in FIG. 2) via an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a PCRF 226 via a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate QoS and charging parameters. The PCRF 226 may provision this rule into a PCEF (not shown) with the appropriate TFT and QCI, which commences the QoS and charging as specified by the application server 230. The Gx reference point between the PCRF 226 and the P-GW 223 may allow for the transfer of QoS policy and charging rules from the PCRF 226 to PCEF in the P-GW 223. An Rx reference point may reside between the PDN 230 (or "AF 230") and the PCRF 226.

Figure 3:
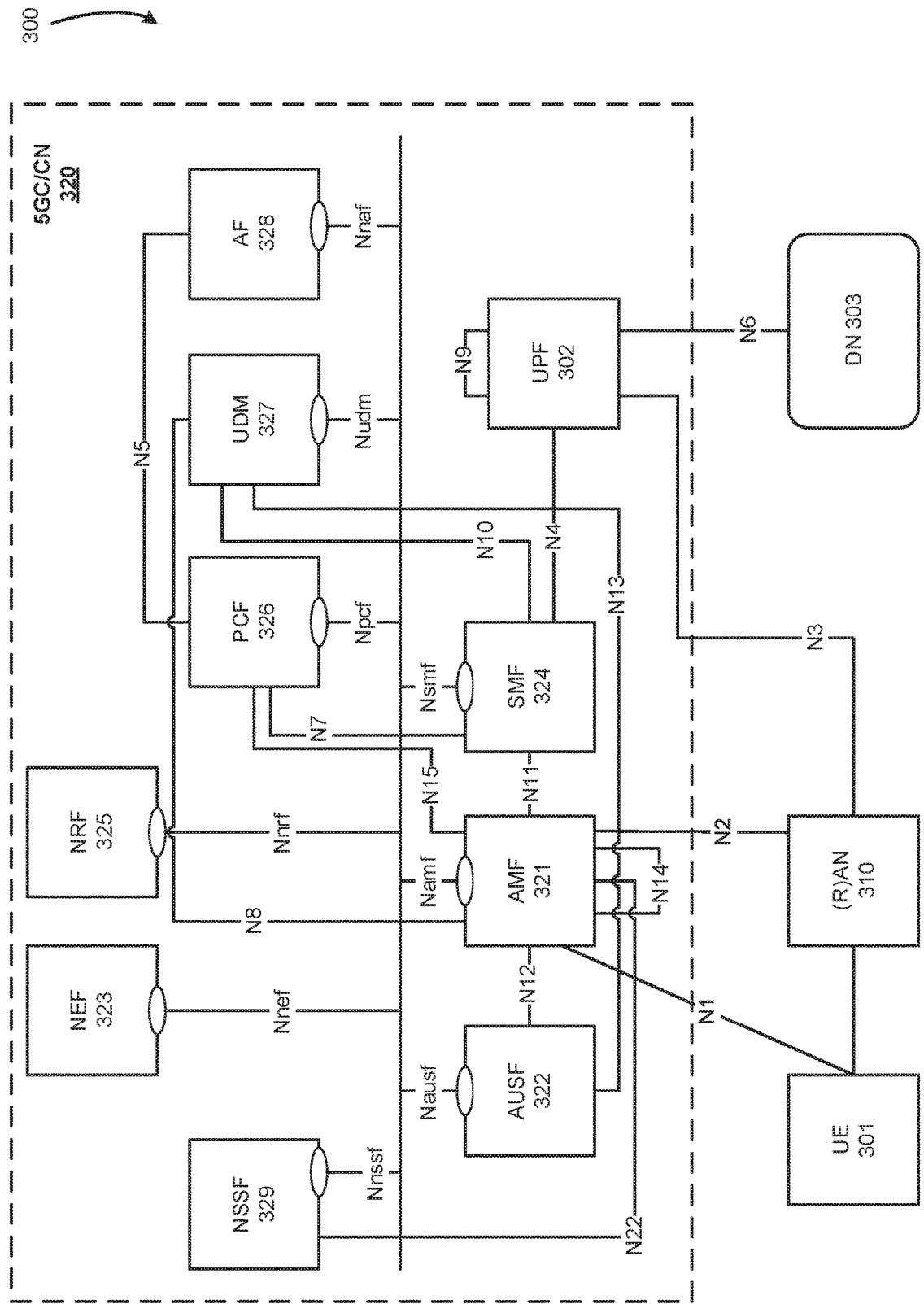

FIG. 3 illustrates an architecture of a system 300 including a second CN 320 in accordance with various embodiments. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a DN 303, which may be, for example, operator services, Internet access or 3rd party services; and a 5GC 320. The 5GC 320 may include an AUSF 322; an AMF 321; a SMF 324; a NEF 323; a PCF 326; a NRF 325; a UDM 327; an AF 328; a UPF 302; and a NSSF 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 via an N4 reference point between the SMF 324 and the UPF 302.

The AUSF 322 may store data for authentication of UE 301 and handle authentication-related functionality. The AUSF 322 may facilitate a common authentication framework for various access types. The AUSF 322 may communicate with the AMF 321 via an N12 reference point between the AMF 321 and the AUSF 322; and may communicate with the UDM 327 via an N13 reference point between the UDM 327 and the AUSF 322. Additionally, the AUSF 322 may exhibit an Nausf service-based interface.

The AMF 321 may be responsible for registration management (e.g., for registering UE 301, etc.), connection management, reachability management, mobility management, and lawful interception of AMF-related events, and access authentication and authorization. The AMF 321 may be a termination point for the an N11 reference point between the AMF 321 and the SMF 324. The AMF 321 may provide transport for SM messages between the UE 301 and the SMF 324, and act as a transparent proxy for routing SM messages. AMF 321 may also provide transport for SMS messages between UE 301 and an SMSF (not shown by FIG. 3). AMF 321 may act as SEAF, which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a SCM function, which receives a key from the SEA that it uses to derive access-network specific keys. Furthermore, AMF 321 may be a termination point of a RAN CP interface, which may include or be an N2 reference point between the (R)AN 310 and the AMF 321; and the AMF 321 may be a termination point of NAS (N1) signalling, and perform NAS ciphering and integrity protection.

AMF 321 may also support NAS signalling with a UE 301 over an N3 IWF interface. The N3IWF may be used to provide access to untrusted entities. N3IWF may be a termination point for the N2 interface between the (R)AN 310 and the AMF 321 for the control plane, and may be a termination point for the N3 reference point between the (R)AN 310 and the UPF 302 for the user plane. As such, the AMF 321 may handle N2 signalling from the SMF 324 and the AMF 321 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 301 and AMF 321 via an N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit an Namf service-based interface, and may be a termination point for an N14 reference point between two AMFs 321 and an N17 reference point between the AMF 321 and a 5G-EIR (not shown by FIG. 3).

The UE 301 may need to register with the AMF 321 in order to receive network services. RM is used to register or deregister the UE 301 with the network (e.g., AMF 321), and establish a UE context in the network (e.g., AMF 321). The UE 301 may operate in an RM-REGISTERED state or an RM-DEREGISTERED state. In the RM-DEREGISTERED state, the UE 301 is not registered with the network, and the UE context in AMF 321 holds no valid location or routing information for the UE 301 so the UE 301 is not reachable by the AMF 321. In the RM-REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be a data structure, database object, etc. that indicates or stores, inter alia, a registration state per access type and the periodic update timer. The AMF 321 may also store a 5GC MM context that may be the same or similar to the (E)MM context discussed previously. In various embodiments, the AMF 321 may store a CE mode B Restriction parameter of the UE 301 in an associated MM context or RM context. The AMF 321 may also derive the value, when needed, from the UE's usage setting parameter already stored in the UE context (and/or MM/RM context).

CM may be used to establish and release a signaling connection between the UE 301 and the AMF 321 over the N1 interface. The signaling connection is used to enable NAS signaling exchange between the UE 301 and the CN 320, and comprises both the signaling connection between the UE and the AN (e.g., RRC connection or UE-N3IWF connection for non-3GPP access) and the N2 connection for the UE 301 between the AN (e.g., RAN 310) and the AMF 321. The UE 301 may operate in one of two CM states, CM-IDLE mode or CM-CONNECTED mode. When the UE 301 is operating in the CM-IDLE state/mode, the UE 301 may have no NAS signaling connection established with the AMF 321 over the N1 interface, and there may be (R)AN 310 signaling connection (e.g., N2 and/or N3 connections) for the UE 301. When the UE 301 is operating in the CM-CONNECTED state/mode, the UE 301 may have an established NAS signaling connection with the AMF 321 over the N1 interface, and there may be a (R)AN 310 signaling connection (e.g., N2 and/or N3 connections) for the UE 301. Establishment of an N2 connection between the (R)AN 310 and the AMF 321 may cause the UE 301 to transition from CM-IDLE mode to CM-CONNECTED mode, and the UE 301 may transition from the CM-CONNECTED mode to the CM-IDLE mode when N2 signaling between the (R)AN 310 and the AMF 321 is released.

The SMF 324 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, etc. In such embodiments, the NEF 323 may authenticate, authorize, and/or throttle the AFs. NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, and/or used for other purposes such as analytics. Additionally, the NEF 323 may exhibit an Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behaviour. The PCF 326 may also implement an FE to access subscription information relevant for policy decisions in a UDR of the UDM 327. The PCF 326 may communicate with the AMF 321 via an N15 reference point between the PCF 326 and the AMF 321, which may include a PCF 326 in a visited network and the AMF 321 in case of roaming scenarios. The PCF 326 may communicate with the AF 328 via an N5 reference point between the PCF 326 and the AF 328; and with the SMF 324 via an N7 reference point between the PCF 326 and the SMF 324. The system 300 and/or CN 320 may also include an N24 reference point between the PCF 326 (in the home network) and a PCF 326 in a visited network. Additionally, the PCF 326 may exhibit an Npcf service-based interface.

The UDM 327 may handle subscription-related information to support the network entities' handling of communication sessions, and may store subscription data of UE 301. For example, subscription data may be communicated between the UDM 327 and the AMF 321 via an N8 reference point between the UDM 327 and the AMF. The UDM 327 may include two parts, an application FE and a UDR (the FE and UDR are not shown by FIG. 3). The UDR may store subscription data and policy data for the UDM 327 and the PCF 326, and/or structured data for exposure and application data (including PFDs for application detection, application request information for multiple UEs 301) for the NEF 323. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 324 via an N10 reference point between the UDM 327 and the SMF 324. UDM 327 may also support SMS management, wherein an SMS-FE implements the similar application logic as discussed previously. Additionally, the UDM 327 may exhibit the Nudm service-based interface.

The AF 328 may provide application influence on traffic routing, provide access to the NCE, and interact with the policy framework for policy control. The NCE may be a mechanism that allows the 5GC 320 and AF 328 to provide information to each other via NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit an Naf service-based interface.

The NSSF 329 may select a set of network slice instances serving the UE 301. The NSSF 329 may also determine allowed NSSAI and the mapping to the subscribed S-NS-SAIs, if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 via an N22 reference point between AMF 321 and NSSF 329; and may communicate with another NSSF 329 in a visited network via an N31 reference point (not shown by FIG. 3). Additionally, the NSSF 329 may exhibit an Nnssf service-based interface.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown by FIG. 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 3). Individual NFs may share a UDSF for storing their respective unstructured data or individual NFs may each have their own UDSF located at or near the individual NFs. Additionally, the UDSF may exhibit a Nudsf service-based interface (not shown by FIG. 3). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 3 for clarity. In one example, the CN 320 may include an Nx interface, which is an inter-CN interface between the MME (e.g., MME 221) and the AMF 321 in order to enable interworking between CN 320 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
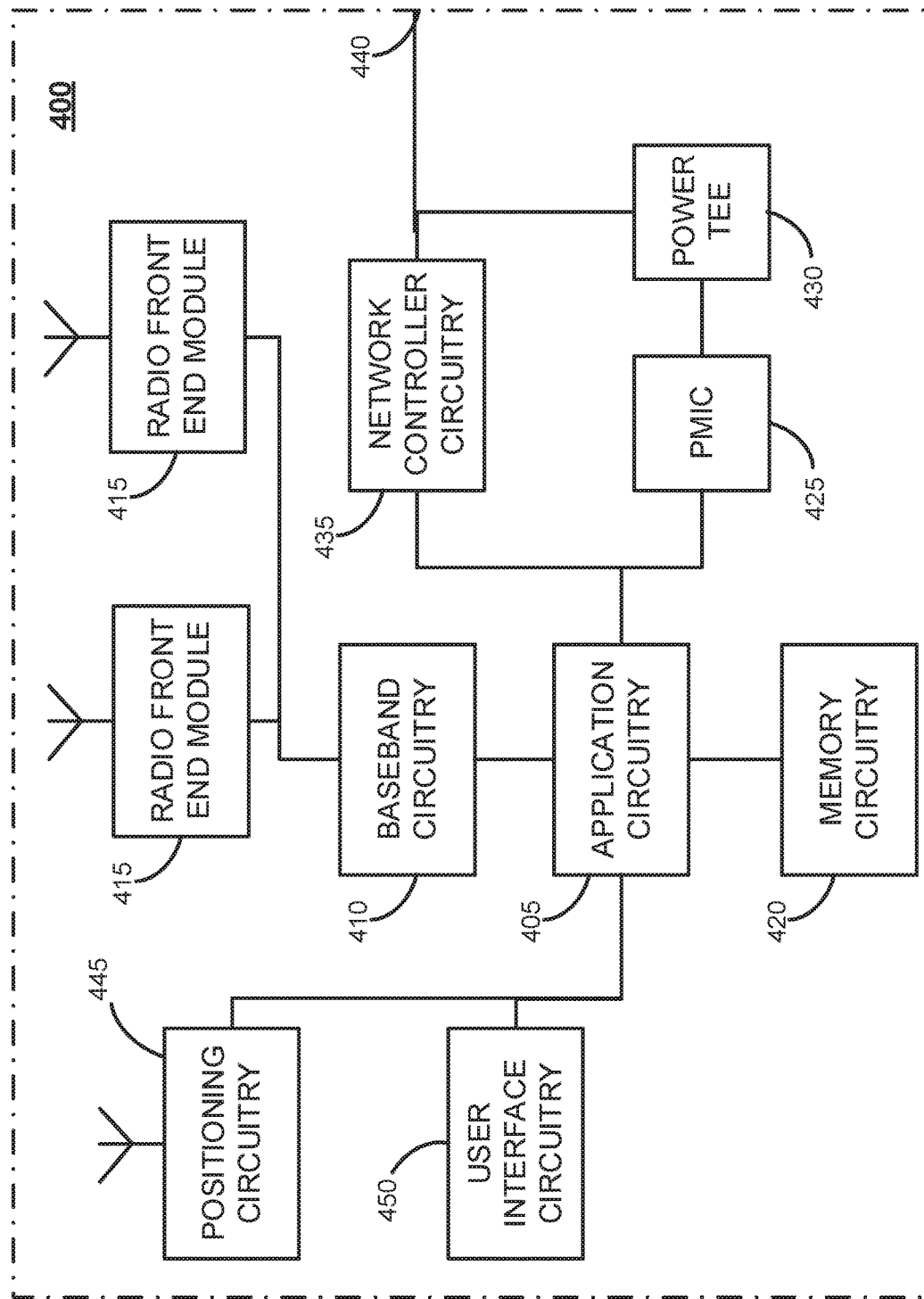
FIG. 4 a block diagram illustrating an example of infrastructure equipment that can be included in a base station, user equipment, or both.

FIG. 4 illustrates an example of infrastructure equipment 400 in accordance with various embodiments. The infrastructure equipment 400 (or "system 400") may be implemented as a base station, radio head, RAN node such as the RAN nodes 111 and/or AP 106 shown and described previously, application server(s) 130, and/or any other element/device discussed herein. In other examples, the system 400 could be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface 450. In some embodiments, the device 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 405 may comprise, or may be, a special-purpose processor/controller to operate according to the various embodiments herein. As examples, the processor(s) of application circuitry 405 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 400 may not utilize application circuitry 405, and instead may include a special-purpose processor/controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 405 may comprise logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed infra with regard to FIG. 6.

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 611 of FIG. 6 infra), and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 445 may include a Micro-Technology for Positioning, Navigation, and Timing (Micro-PNT) IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., RAN nodes 111, etc.), or the like.

The components shown by FIG. 4 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 5:
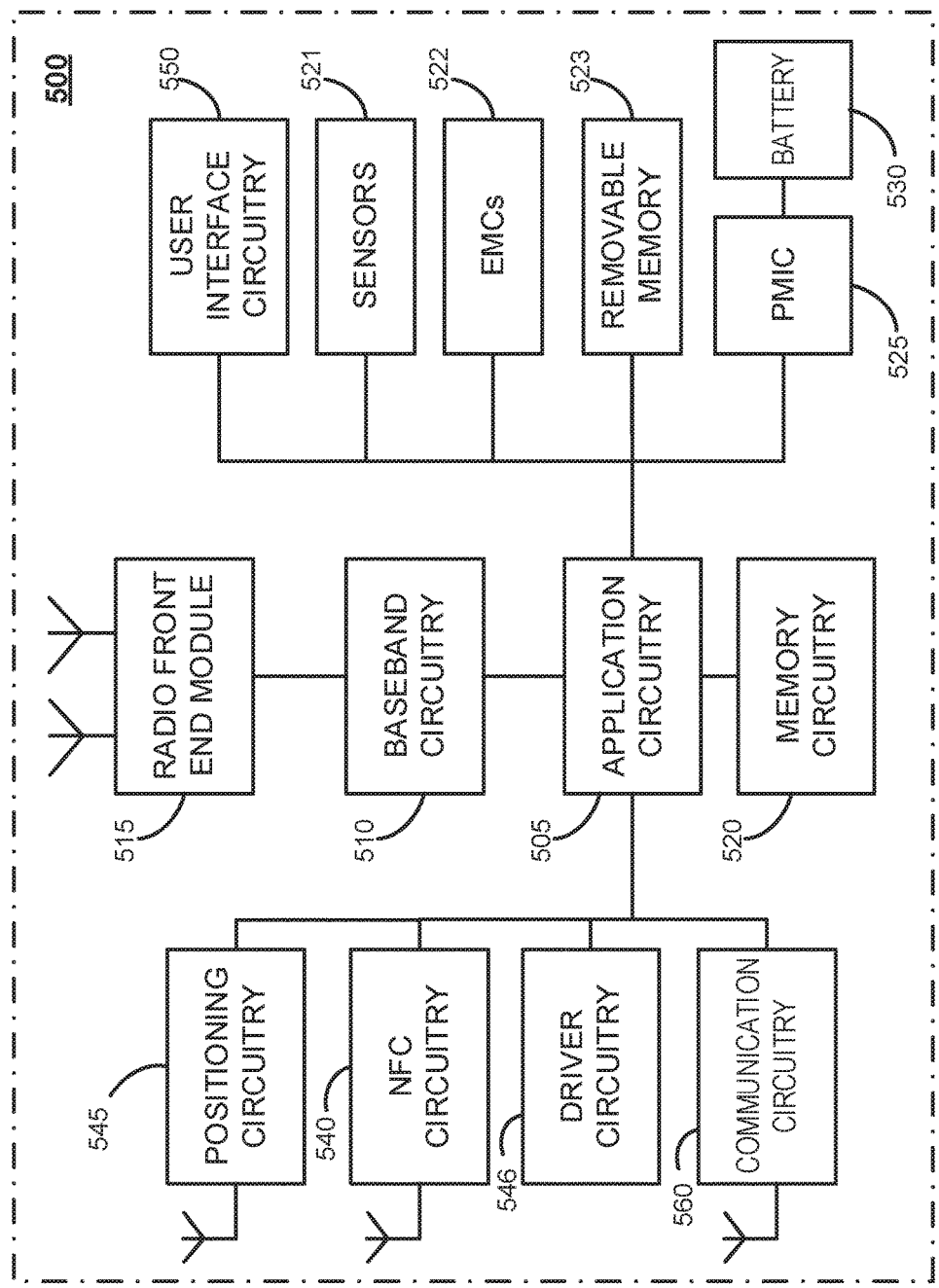
FIG. 5 is a block diagram illustrating an example computer platform that can be included in user equipment, an application server, or both.

FIG. 5 illustrates an example of a platform 500 (or "device 500") in accordance with various embodiments. In embodiments, the computer platform 500 may be suitable for use as UEs 101, 201, 301, application servers 130, and/or any other element/device discussed in this document. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed in this document.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 405 may comprise, or may be, a special-purpose processor/controller to operate according to the various embodiments in this document.

As examples, the processor(s) of application circuitry 505 may include an Apple A-series processor. The processors of the application circuitry 505 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 may be a part of a system on a chip (SoC) in which the application circuitry 505 and other components are formed into a single integrated circuit, or a single package.

Additionally or alternatively, application circuitry 505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 505 may comprise logic blocks or logic fabric, and other interconnected resources that may be programmed to perform various functions, such as the procedures, methods, functions, etc. of the various embodiments discussed in this document. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed infra with regard to FIG. 6.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 611 of FIG. 6 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 500 may incorporate the three-dimensional (3D) cross-point (XPOINT) memories from Intel® and Micron®.

Removable memory circuitry 523 may include devices, circuitry, enclosures/housings, ports or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 500 may also include interface circuitry (not shown) that is used to connect external devices with the platform 500. The external devices connected to the platform 500 via the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 522 include devices, modules, or subsystems whose purpose is to enable platform 500 to change its state, position, and/or orientation, or move or control a mechanism or (sub)system. Additionally, EMCs 522 may be configured to generate and send messages/signaling to other components of the platform 500 to indicate a current state of the EMCs 522. Examples of the EMCs 522 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 500 is configured to operate one or more EMCs 522 based on one or more captured events and/or instructions or control signals received from a service provider and/or various clients.

In some implementations, the interface circuitry may connect the platform 500 with positioning circuitry 545. The positioning circuitry 545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-PNT IC that uses a master timing clock to perform position tracking/estimation without GNSS assistance. The positioning circuitry 545 may also be part of, or interact with, the baseband circuitry 410 and/or RFEMs 515 to communicate with the nodes and components of the positioning network. The positioning circuitry 545 may also provide position data and/or time data to the application circuitry 505, which may use the data to synchronize operations with various infrastructure (e.g., radio base stations), for turn-by-turn navigation applications, or the like In some implementations, the interface circuitry may connect the platform 500 with Near-Field Communication (NFC) circuitry 540. NFC circuitry 540 is configured to provide contactless, short-range communications based on radio frequency identification (RFID) standards, wherein magnetic field induction is used to enable communication between NFC circuitry 540 and NFC-enabled devices external to the platform 500 (e.g., an "NFC touchpoint"). NFC circuitry 540 comprises an NFC controller coupled with an antenna element and a processor coupled with the NFC controller. The NFC controller may be a chip/IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

In some implementations, the interface circuitry may connect the platform 500 with communications circuitry 560. Though communications circuitry 560 is shown as separate from the RFEM 515, these modules can form a single, combined module. The communication circuitry 560 is configured to enable the platform 500 to communicate on the cellular network, as subsequently described in relation to FIG. 7.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 and/or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may often be included when the platform 500 is capable of being powered by a battery 530, for example, when the device is included in a UE 101, 201, 301.

In some embodiments, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 530 may power the platform 500, although in some examples the platform 500 may be mounted deployed in a fixed location, and may have a power supply coupled to an electrical grid. The battery 530 may be a lithium ion battery, a metal-air battery, such as a zinc-air battery, an aluminum-air battery, a lithium-air battery, and the like. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, sensing frequency, and the like.

A power block, or other power supply coupled to an electrical grid may be coupled with the BMS to charge the battery 530. In some examples, the power block XS30 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 550 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some embodiments, the sensor circuitry 521 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 6:
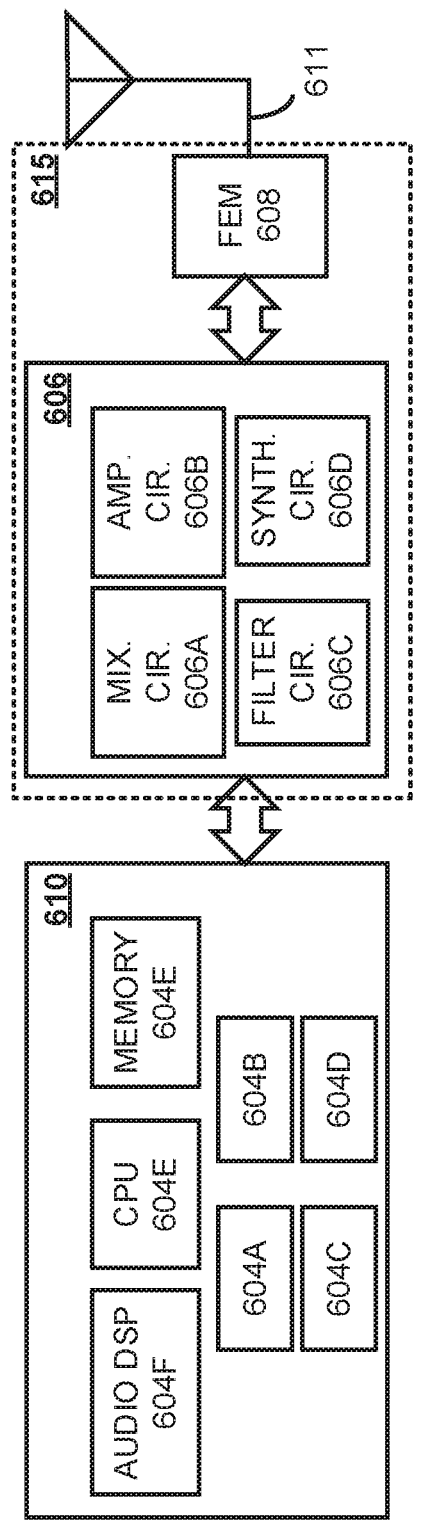
FIG. 6 is a block diagram illustrating example baseband circuitry and radio front end module circuitry.

FIG. 6 illustrates example components of baseband circuitry 610 and radio front end modules (RFEM) 615 in accordance with various embodiments. The baseband circuitry 610 corresponds to the baseband circuitry 410 and 510 of FIGS. 4 and 5, respectively. The RFEM 615 corresponds to the RFEM 415 and 515 of FIGS. 4 and 5, respectively. As shown, the RFEMs 615 may include Radio Frequency (RF) circuitry 606, front-end module (FEM) circuitry 608, antenna array 611 coupled together at least as shown.

The baseband circuitry 610 includes circuitry and/or control logic configured to carry out various radio/network protocol and radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 610 may include Fast-Fourier Transform (FFT), precoding, or constellation mapping/demapping functionality. In some embodiments, encoding/decoding circuitry of the baseband circuitry 610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry 405/505 (see FIGS. 4 and 5) for generation and processing of the baseband signals and for controlling operations of the RF circuitry 606. The baseband circuitry 610 may handle various radio control functions.

The aforementioned circuitry and/or control logic of the baseband circuitry 610 may include one or more single or multi-core processors. For example, the one or more processors may include a 3G baseband processor 604A, a 4G/LTE baseband processor 604B, a 5G/NR baseband processor 604C, or some other baseband processor(s) 604D for other existing generations, generations in development or to be developed in the future (e.g., sixth generation (6G), etc.). In other embodiments, some or all of the functionality of baseband processors 604A-D may be included in modules stored in the memory 604G and executed via a Central Processing Unit (CPU) 604E. In other embodiments, some or all of the functionality of baseband processors 604A-D may be provided as hardware accelerators (e.g., FPGAs, ASICs, etc.) loaded with the appropriate bit streams or logic blocks stored in respective memory cells. In various embodiments, the memory 604G may store program code of a real-time OS (RTOS), which when executed by the CPU 604E (or other baseband processor), is to cause the CPU 604E (or other baseband processor) to manage resources of the baseband circuitry 610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed in this document. In addition, the baseband circuitry 610 includes one or more audio digital signal processor(s) (DSP) 604F. The audio DSP(s) 604F include elements for compression/decompression and echo cancellation and may include other suitable processing elements in other embodiments.

In some embodiments, each of the processors 604A-604E include respective memory interfaces to send/receive data to/from the memory 604G. The baseband circuitry 610 may further include one or more interfaces to communicatively couple to other circuitries/devices, such as an interface to send/receive data to/from memory external to the baseband circuitry 610; an application circuitry interface to send/receive data to/from the application circuitry 405/505 of FIGS. 4-XT); an RF circuitry interface to send/receive data to/from RF circuitry 606 of FIG. 6; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 525.

In alternate embodiments (which may be combined with the above described embodiments), baseband circuitry 610 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed in this document. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

Although not shown by FIG. 6, in some embodiments, the baseband circuitry 610 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 610 and/or RF circuitry 606 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 610 and/or RF circuitry 606 are part of a Wi-Fi communication system. In the second example, the protocol processing circuitry would operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed in this document may be implemented, for example, as a solder-down substrate including one or more integrated circuits (ICs), a single packaged IC soldered to a main circuit board or a multi-chip module containing two or more ICs. In one example, the components of the baseband circuitry 610 may be suitably combined in a single chip or chipset, or disposed on a same circuit board. In another example, some or all of the constituent components of the baseband circuitry 610 and RF circuitry 606 may be implemented together such as, for example, a system on a chip (SoC) or System-in-Package (SiP). In another example, some or all of the constituent components of the baseband circuitry 610 may be implemented as a separate SoC that is communicatively coupled with and RF circuitry 606 (or multiple instances of RF circuitry 606). In yet another example, some or all of the constituent components of the baseband circuitry 610 and the application circuitry 405/505 may be implemented together as individual SoCs mounted to a same circuit board (e.g., a "multi-chip package").

In some embodiments, the baseband circuitry 610 may provide for communication compatible with one or more radio technologies. For example, in some embodiments, the baseband circuitry 610 may support communication with an E-UTRAN or other WMAN, a WLAN, a WPAN. Embodiments in which the baseband circuitry 610 is configured to support radio communications of more than one wireless protocol may be referred to as multi-mode baseband circuitry.

RF circuitry 606 enables communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path, which may include circuitry to down-convert RF signals received from the FEM circuitry 608 and provide baseband signals to the baseband circuitry 610. RF circuitry 606 may also include a transmit signal path, which may include circuitry to up-convert baseband signals provided by the baseband circuitry 610 and provide RF output signals to the FEM circuitry 608 for transmission.

In some embodiments, the receive signal path of the RF circuitry 606 includes mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 610 or the application circuitry 405/505 depending on the desired output frequency. In some embodiments, a divider control input (e.g., N) may be determined from a look-up table based on a channel indicated by the application circuitry 405/505.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from antenna array 611, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of antenna elements of antenna array 611. In various embodiments, the amplification through the transmit or receive signal paths may be done solely in the RF circuitry 606, solely in the FEM circuitry 608, or in both the RF circuitry 606 and the FEM circuitry 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted via the antenna elements of the antenna array 611 including one or more antenna elements (not shown). The antenna elements may be omnidirectional, direction, or a combination thereof. The antenna elements may be formed in a multitude of arranges as are known and/or discussed in this document. The antenna array 611 may comprise microstrip antennas or printed antennas that are fabricated on the surface of one or more printed circuit boards. The antenna array 611 may be formed in as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may be used execute Layer 3, Layer 2, or Layer 1 functionality, while processors of the application circuitry 405/505 may utilize data (e.g., packet data) received from these layers and further execute Layer 4 functionality (e.g., TCP and UDP layers). As referred to in this document, Layer 3 may comprise a RRC layer, described in further detail below. As referred to in this document, Layer 2 may comprise a MAC layer, an RLC layer, and a PDCP layer, described in further detail below. As referred to in this document, Layer 1 may comprise a PHY layer of a UE/RAN node, described in further detail below.

Figure 7:
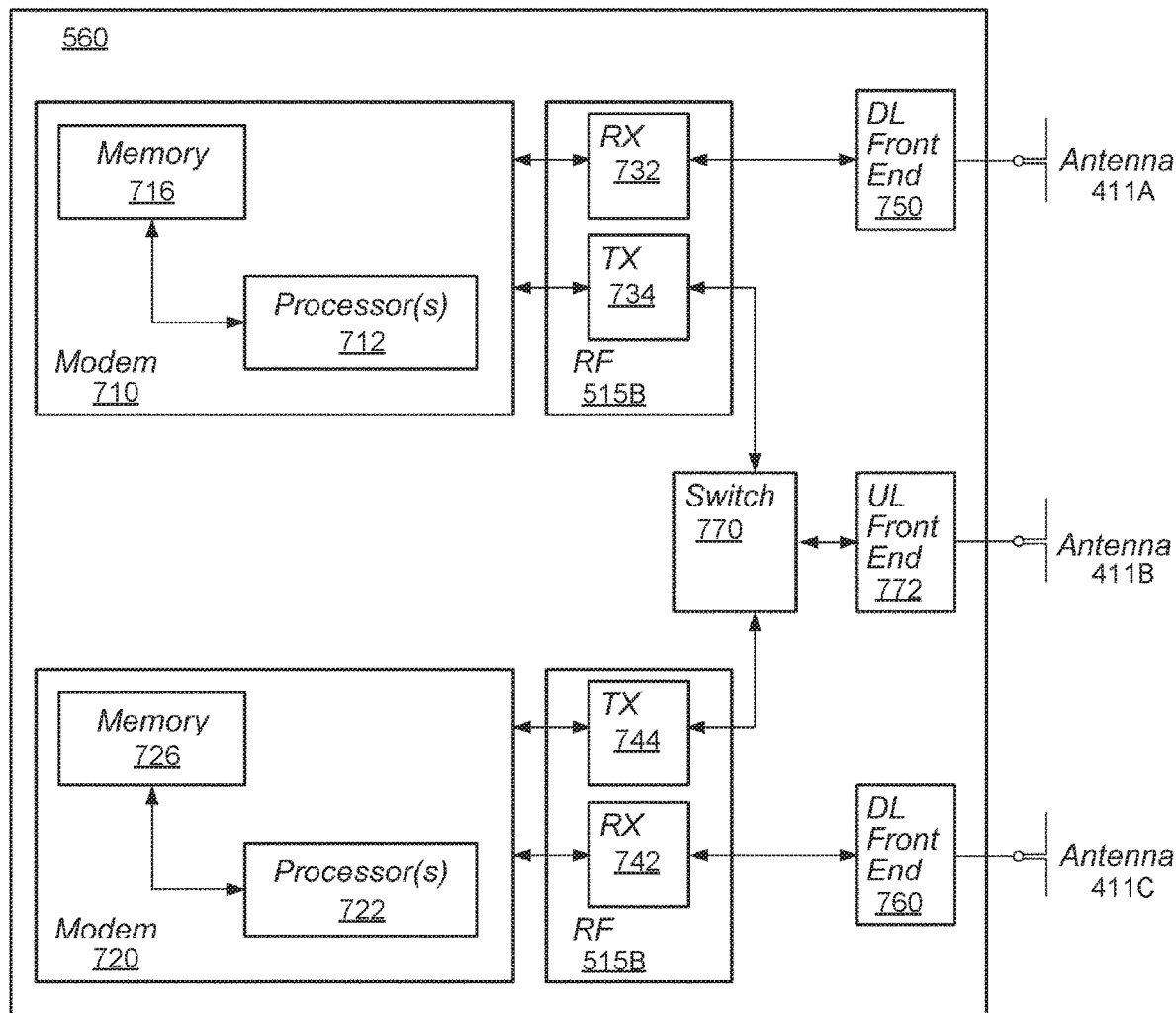
FIG. 7 is a block diagram illustrating example cellular communication circuitry.

FIG. 7 illustrates an example block diagram of cellular communication circuitry 560. It is noted that the block diagram of the cellular communication circuitry 560 of FIG. 7 is an example of a cellular communication circuit, but that other configurations are also possible. In some implementations, the cellular communication circuitry 560 may be included in a communication device, such as the platform 500 described above. As noted above, platform 500 may be a UE device, a mobile device or mobile station, a wireless device or wireless station, a desktop computer or computing device, a mobile computing device (e.g., a laptop, notebook, or portable computing device), a tablet, a wireless sensor, surveillance equipment, or wearables devices, or a combination of them, among other devices.

The cellular communication circuitry 560 may couple (e.g., communicatively, directly, or indirectly) to one or more antennas, such as antennas of antenna array 611 as shown (e.g., in FIG. 6). In some implementations, the cellular communication circuitry 560 includes or is communicatively coupled to dedicated receive chains, processors, or radios for multiple RATs (e.g., a first receive chain for LTE and a second receive chain for 5G NR). For example, as shown in FIG. 7, cellular communication circuitry 560 may include a modem 710 and a modem 720. Modem 710 may be configured for communications according to a first RAT, e.g., such as LTE or LTE-A, and modem 720 may be configured for communications according to a second RAT, e.g., such as 5G NR.

The modem 710 includes one or more processors 712 and a memory 716 in communication with the processors 712. The modem 710 is in communication with a radio frequency front end module 515a (e.g., RFEM 515). The RFEM 515a may include circuitry for transmitting and receiving radio signals. For example, the RF front end 730 includes receive circuitry (RX) 732 and transmit circuitry (TX) 734. In some implementations, the receive circuitry 732 is in communication with downlink (DL) front end 750, which may include circuitry for receiving radio signals via antenna 611a.

Similarly, the modem 720 includes one or more processors 722 and a memory 726 in communication with the processors 722. The modem 720 is in communication with an RFEM 515b. The RFEM 515b may include circuitry for transmitting and receiving radio signals. For example, the RF front end 740 may include receive circuitry 742 and transmit circuitry 744. In some implementations, the receive circuitry 742 is in communication with DL front end 760, which may include circuitry for receiving radio signals via antenna 611b.

The modem 710 may include hardware and software components for implementing the above features or for time division multiplexing UL data for NSA NR operations, as well as the various other techniques described in this document. The processors 712 may be configured to implement part or all of the features described in this document, e.g., by executing program instructions stored on a memory medium (e.g., a non-transitory computer-readable memory medium). Alternatively (or in addition), the processor 712 may be configured as a programmable hardware element, such as an FPGA (Field Programmable Gate Array), or as an ASIC (Application Specific Integrated Circuit). Alternatively (or in addition) the processor 712, in conjunction with one or more of the other components 730, 732, 734, 750, 770, 772, and 611 may be configured to implement some or all of the features described in this document.

The processors 712 may include one or more processing elements. Thus, processors 712 may include one or more integrated circuits (ICs) that are configured to perform the functions of processors 712. In addition, each integrated circuit may include circuitry (e.g., first circuitry, second circuitry, etc.) configured to perform the functions of processors 712.

The modem 720 may include hardware and software components for implementing the above features for time division multiplexing UL data for NSA NR operations, as well as the various other techniques described in this document. The processors 722 may be configured to implement part or all of the features described in this document, e.g., by executing program instructions stored on a memory medium (e.g., a non-transitory computer-readable memory medium). Alternatively (or in addition), processor 722 may be configured as a programmable hardware element, such as an FPGA (Field Programmable Gate Array), or as an ASIC (Application Specific Integrated Circuit). Alternatively (or in addition) the processor 722, in conjunction with one or more of the other components 740, 742, 744, 750, 770, 772, and 611 may be configured to implement part or all of the features described in this document.

In addition, the processors 722 may include one or more processing elements. Thus, the processors 722 may include one or more integrated circuits (ICs) that are configured to perform the functions of processors 722. In addition, each integrated circuit may include circuitry (e.g., first circuitry, second circuitry, etc.) configured to perform the functions of processors 722.

Figure 8:
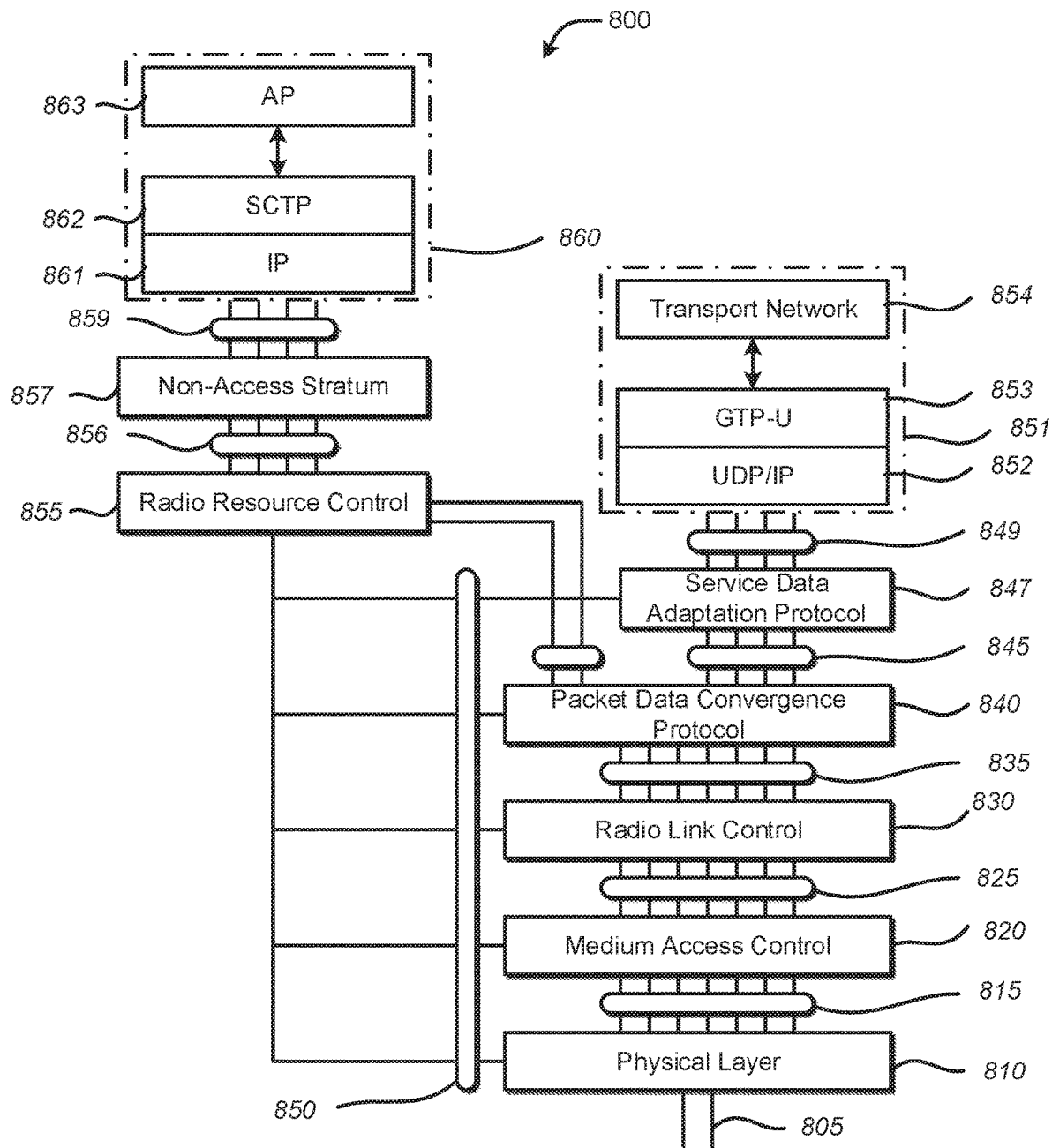
FIG. 8 is a block diagram illustrating example protocol functions for implementing in a wireless communication device.

FIG. 8 is a block diagram illustrating example protocol functions for implementing in a wireless communication device according to various embodiments. In particular, FIG. 8 includes an arrangement 800 showing interconnections between various protocol layers/entities. The following description of FIG. 8 is provided for various protocol layers/entities that operate in conjunction with the 5G/NR system standards and LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may comprise one or more physical channels, such as those discussed in this document. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 810 may process requests from and provide indications to an instance of MAC 820 via one or more PHY-SAP 815. According to some embodiments, requests and indications communicated via PHY-SAP 815 may comprise one or more transport channels.

Instance(s) of MAC 820 may process requests from, and provide indications to, an instance of RLC 830 via one or more MAC-SAPs 825. These requests and indications communicated via the MAC-SAP 825 may comprise one or more logical channels. The MAC 820 may perform mapping between the logical channels and transport channels, multiplexing of MAC SDUs from one or more logical channels onto TBs to be delivered to PHY 810 via the transport channels, de-multiplexing MAC SDUs to one or more logical channels from TBs delivered from the PHY 810 via transport channels, multiplexing MAC SDUs onto TBs, scheduling information reporting, error correction through HARQ, and logical channel prioritization.

Instance(s) of RLC 830 may process requests from and provide indications to an instance of PDCP 840 via one or more radio link control service access points (RLC-SAP) 835. These requests and indications communicated via RLC-SAP 835 may comprise one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 and/or instance(s) of SDAP 847 via one or more packet data convergence protocol service access points (PDCP-SAP) 845. These requests and indications communicated via PDCP-SAP 845 may comprise one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 847 may process requests from and provide indications to one or more higher layer protocol entities via one or more SDAP-SAP 849. These requests and indications communicated via SDAP-SAP 849 may comprise one or more QoS flows. The SDAP 847 may map QoS flows to DRBs, and vice versa, and may also mark QFIs in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In embodiments, the SDAP 847 may only be used in NR implementations and may not be used in LTE implementations.

The RRC 855 may configure, via one or more management service access points (M-SAP), aspects of one or more protocol layers, which may include one or more instances of PHY 810, MAC 820, RLC 830, PDCP 840 and SDAP 847. In embodiments, an instance of RRC 855 may process requests from and provide indications to one or more NAS entities 857 via one or more RRC-SAPs 856. The main services and functions of the RRC 855 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

According to various embodiments, one or more protocol entities of arrangement 800 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In such embodiments, one or more protocol entities that may be implemented in one or more of UE 101, gNB 111, AMF 321, etc. may communicate with a respective peer protocol entity that may be implemented in or on another device using the services of respective lower layer protocol entities to perform such communication. In some embodiments, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In a first example, a control plane protocol stack may comprise, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise Elementary Procedures (EPs). An NG-AP EP may be a unit of interaction between the NG-RAN node 111 and the AMF 321. The NG-AP 863 services may comprise two groups: UE-associated services (e.g., services related to a UE 101) and non-UE-associated services (e.g., services related to the whole NG interface instance between the NG-RAN node 111 and AMF 321). These services may include functions including, but not limited to: a paging function for the sending of paging requests to NG-RAN nodes 111 involved in a particular paging area; a UE context management function for allowing the AMF 321 to establish, modify, and/or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP may comprise S1-AP EPs. An S1-AP EP may be a unit of interaction between the E-UTRAN node 111 and an MME 221 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based, in part, on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data via a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data via a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 9:
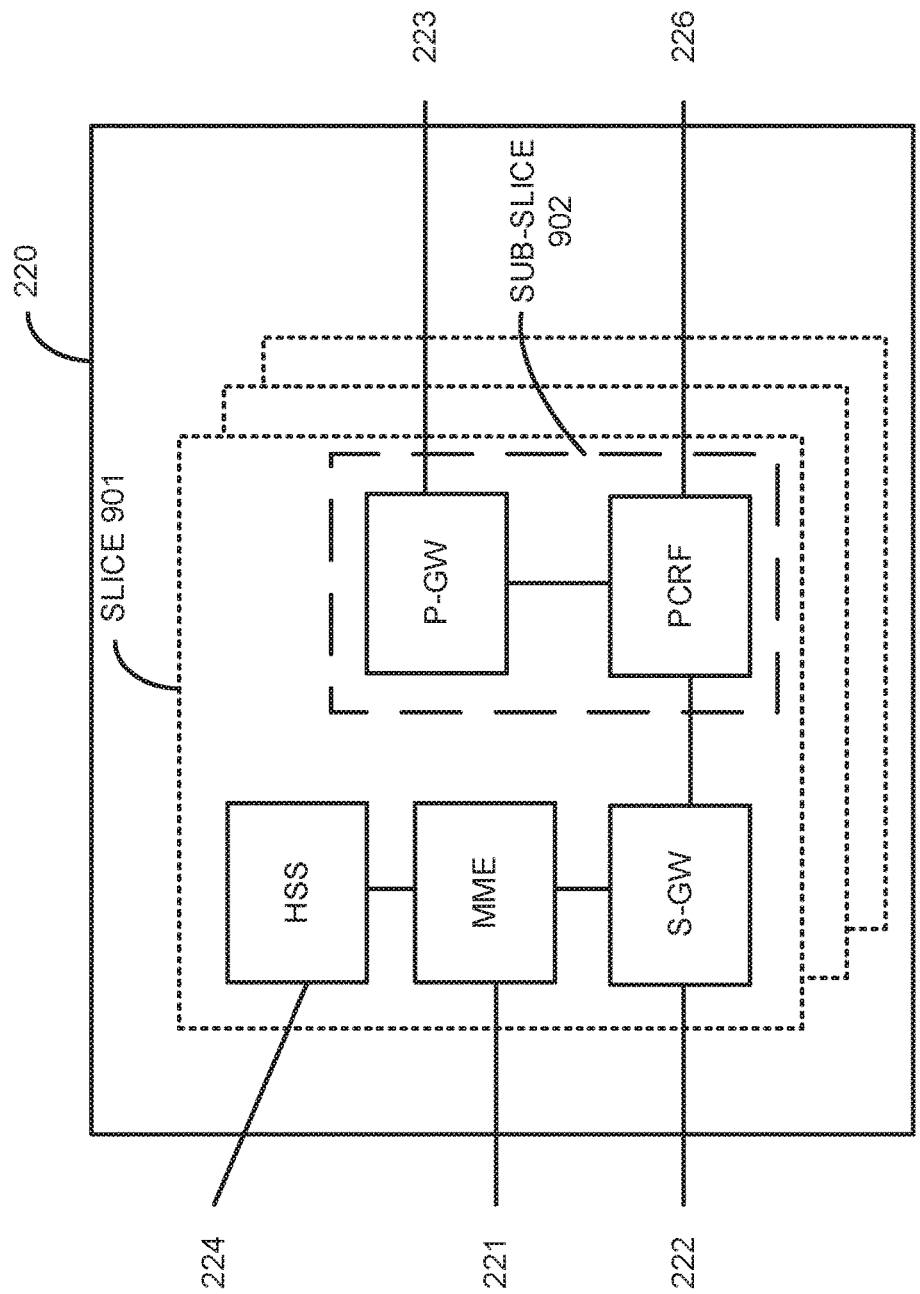
FIG. 9 is a block diagram illustrating example components of a core network.

FIG. 9 illustrates components of a core network in accordance with various embodiments. The components of the CN 220 may be implemented in one physical node or separate physical nodes including components to read and execute instructions from a machine-readable or computer-readable medium (e.g., a non-transitory machine-readable storage medium). In embodiments, the components of CN 320 may be implemented in a same or similar manner as discussed in this document with regard to the components of CN 220. In some embodiments, NFV is utilized to virtualize any or all of the above-described network node functions via executable instructions stored in one or more computer-readable storage mediums (described in further detail below). A logical instantiation of the CN 220 may be referred to as a network slice 901, and individual logical instantiations of the CN 220 may provide specific network capabilities and network characteristics. A logical instantiation of a portion of the CN 220 may be referred to as a network sub-slice 902 (e.g., the network sub-slice 902 is shown to include the P-GW 223 and the PCRF 226).

As used in this document, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 3), a network slice always comprises a RAN part and a CN part. The support of network slicing relies on the principle that traffic for different slices is handled by different PDU sessions. The network can realize the different network slices by scheduling and also by providing different L1/L2 configurations. The UE 301 provides assistance information for network slice selection in an appropriate RRC message, if it has been provided by NAS. While the network can support large number of slices, the UE need not support more than 8 slices simultaneously.

A network slice may include the CN 320 control plane and user plane NFs, NG-RANs 310 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 301 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 321 instance serving an individual UE 301 may belong to each of the network slice instances serving that UE.

Network Slicing in the NG-RAN 310 involves RAN slice awareness. RAN slice awareness includes differentiated handling of traffic for different network slices, which have been pre-configured. Slice awareness in the NG-RAN 310 is introduced at the PDU session level by indicating the S-NSSAI corresponding to a PDU session in all signaling that includes PDU session resource information. How the NG-RAN 310 supports the slice enabling in terms of NG-RAN functions (e.g., the set of network functions that comprise each slice) is implementation dependent. The NG-RAN 310 selects the RAN part of the network slice using assistance information provided by the UE 301 or the 5GC 320, which unambiguously identifies one or more of the pre-configured network slices in the PLMN. The NG-RAN 310 also supports resource management and policy enforcement between slices as per SLAs. A single NG-RAN node may support multiple slices, and the NG-RAN 310 may also apply an appropriate RRM policy for the SLA in place to each supported slice. The NG-RAN 310 may also support QoS differentiation within a slice.

The NG-RAN 310 may also use the UE assistance information for the selection of an AMF 321 during an initial attach, if available. The NG-RAN 310 uses the assistance information for routing the initial NAS to an AMF 321. If the NG-RAN 310 is unable to select an AMF 321 using the assistance information, or the UE 301 does not provide any such information, the NG-RAN 310 sends the NAS signaling to a default AMF 321, which may be among a pool of AMFs 321. For subsequent accesses, the UE 301 provides a temp ID, which is assigned to the UE 301 by the 5GC 320, to enable the NG-RAN 310 to route the NAS message to the appropriate AMF 321 as long as the temp ID is valid. The NG-RAN 310 is aware of, and can reach, the AMF 321 that is associated with the temp ID. Otherwise, the method for initial attach applies.

The NG-RAN 310 supports resource isolation between slices. NG-RAN 310 resource isolation may be achieved by means of RRM policies and protection mechanisms that should avoid that shortage of shared resources if one slice breaks the service level agreement for another slice. In some implementations, it is possible to fully dedicate NG-RAN 310 resources to a certain slice. How NG-RAN 310 supports resource isolation is implementation dependent.

Some slices may be available only in part of the network. Awareness in the NG-RAN 310 of the slices supported in the cells of its neighbors may be beneficial for inter-frequency mobility in connected mode. The slice availability may not change within the UE's registration area. The NG-RAN 310 and the 5GC 320 are responsible to handle a service request for a slice that may or may not be available in a given area. Admission or rejection of access to a slice may depend on factors such as support for the slice, availability of resources, support of the requested service by NG-RAN 310.

The UE 301 may be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can be used to control the frequency on which the UE 301 camps. The 5GC 320 is to validate that the UE 301 has the rights to access a network slice. Prior to receiving an Initial Context Setup Request message, the NG-RAN 310 may be allowed to apply some provisional/local policies, based on awareness of a particular slice that the UE 301 is requesting to access. During the initial context setup, the NG-RAN 310 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
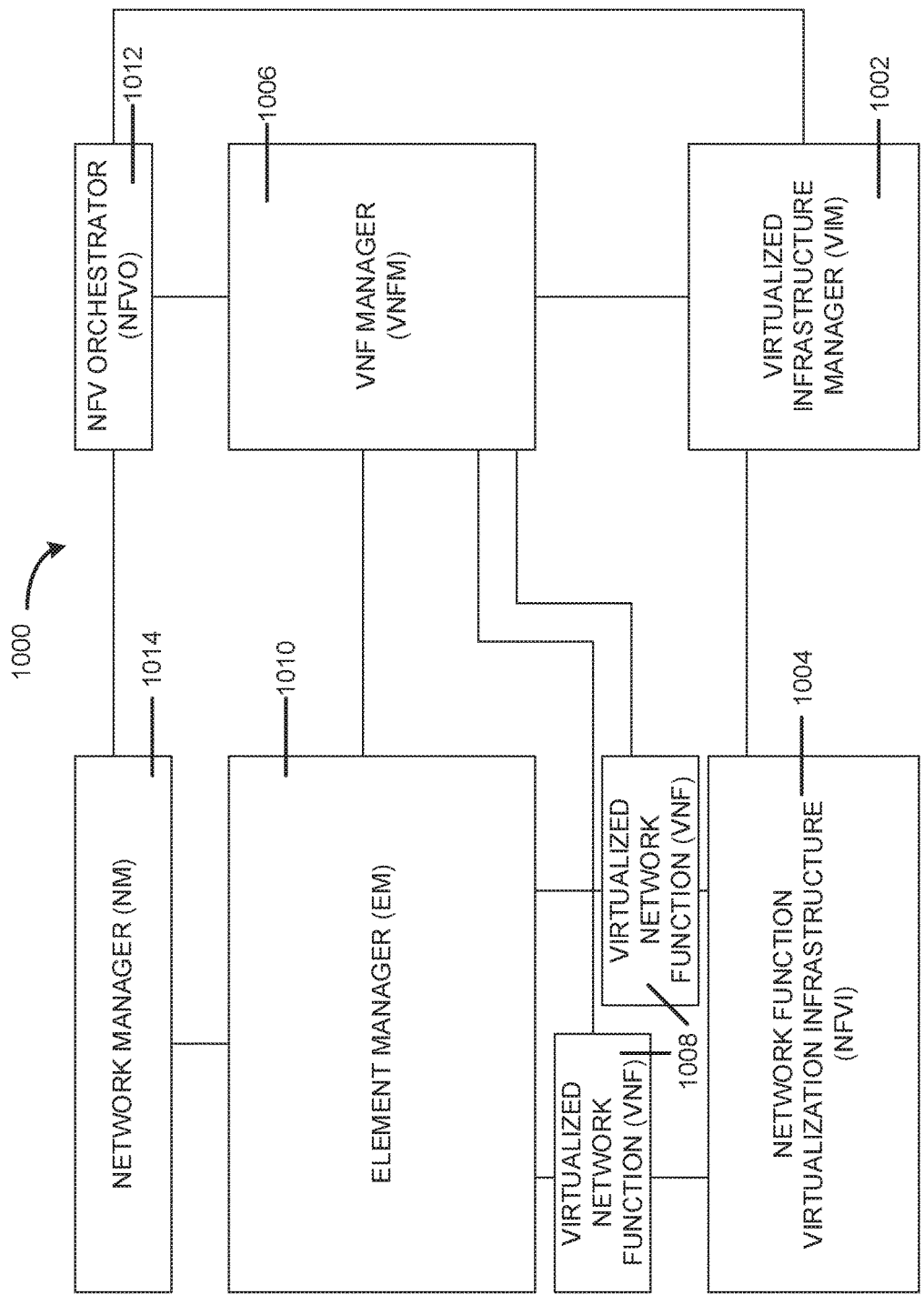
FIG. 10 is a block diagram illustrating a system for executing network functions virtualization (NFV).

FIG. 10 is a block diagram illustrating components, according to some example embodiments, of a system 1000 to support NFV. The system 1000 is illustrated as including a VIM 1002, an NFVI 1004, a VNFM 1006, VNFs 1008, an EM 1010, an NFVO 1012, and a NM 1014.

The VIM 1002 manages the resources of the NFVI 1004. The NFVI 1004 can include physical or virtual resources and applications (including hypervisors) used to execute the system 1000. The VIM 1002 may manage the life cycle of virtual resources with the NFVI 1004 (e.g., creation, maintenance, and tear down of VMs associated with one or more physical resources), track VM instances, track performance, fault and security of VM instances and associated physical resources, and expose VM instances and associated physical resources to other management systems.

The VNFM 1006 may manage the VNFs 1008. The VNFs 1008 may be used to execute EPC components/functions. The VNFM 1006 may manage the life cycle of the VNFs 1008 and track performance, fault and security of the virtual aspects of VNFs 1008. The EM 1010 may track the performance, fault and security of the functional aspects of VNFs 1008. The tracking data from the VNFM 1006 and the EM 1010 may comprise, for example, PM data used by the VIM 1002 or the NFVI 1004. Both the VNFM 1006 and the EM 1010 can scale up/down the quantity of VNFs of the system 1000.

The NFVO 1012 may coordinate, authorize, release and engage resources of the NFVI 1004 in order to provide the requested service (e.g., to execute an EPC function, component, or slice). The NM 1014 may provide a package of end-user functions with the responsibility for the management of a network, which may include network elements with VNFs, non-virtualized network functions, or both (management of the VNFs may occur via the EM 1010).

Figure 11:
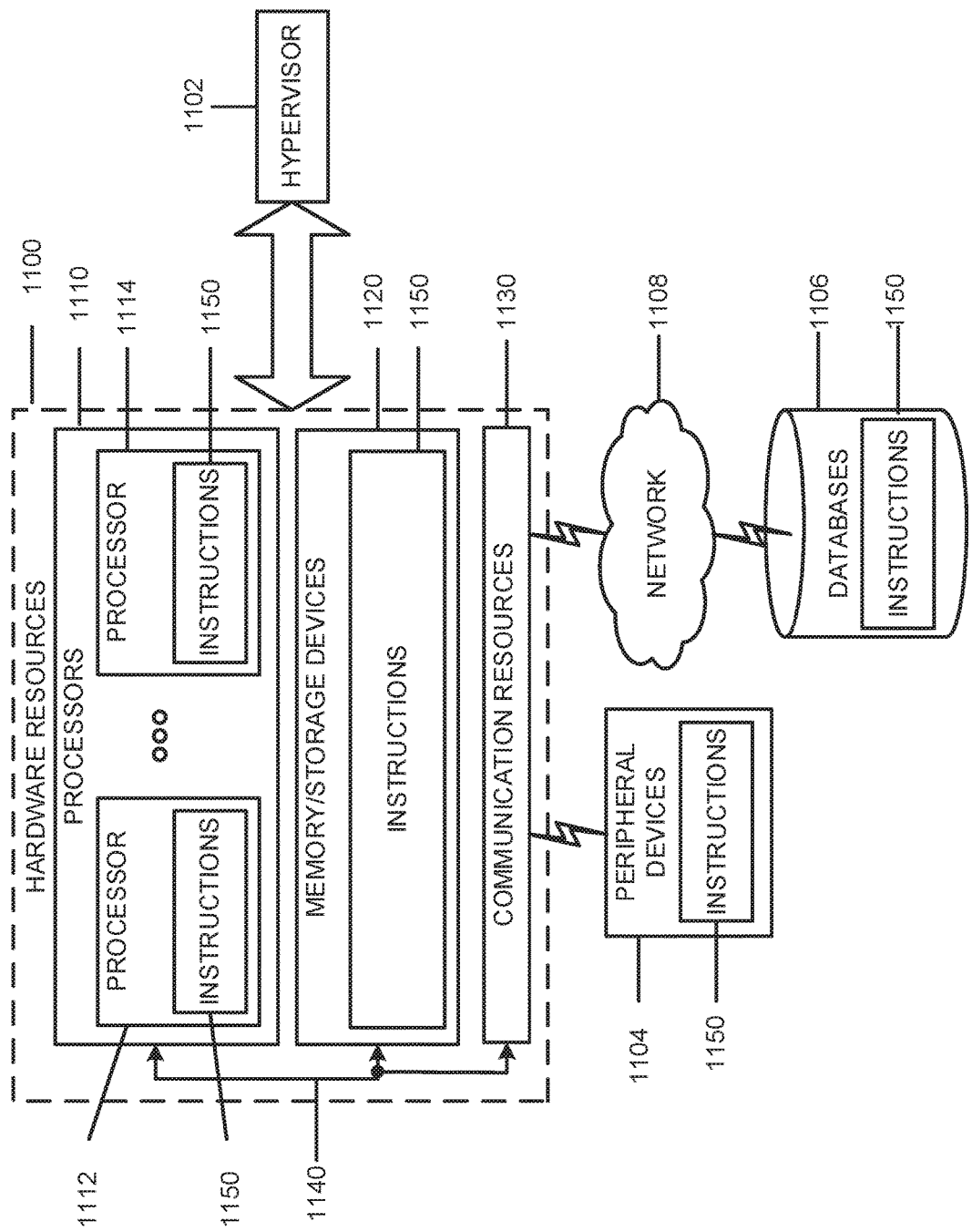
FIG. 11 is a block diagram of an example computing system for executing executable instructions.

FIG. 11 is a block diagram illustrating components, according to some example embodiments, able to read instructions from a machine-readable or computer-readable medium (e.g., a non-transitory machine-readable storage medium) and perform any one or more of the methodologies discussed in this document. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed in this document), or any suitable combination thereof.

The memory/storage devices 1120 may include main memory, disk storage, or any suitable combination thereof.

The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed in this document. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

Generally, the term "circuitry" as used in this document refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used in this document refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used in this document refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used in this document refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used in this document refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used in this document refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used in this document refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used in this document refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used in this document refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used in this document refers to a connection between two devices through a RAT for the purpose of transmitting and receiving information.

The terms "instantiate," "instantiation," and the like as used in this document refers to the creation of an instance. An "instance" also refers to a concrete occurrence of an object, which may occur, for example, during execution of program code.

The terms "coupled," "communicatively coupled," along with derivatives thereof are used in this document. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content. The term "SMTC" refers to an SSB-based measurement timing configuration configured by SSB-MeasurementTimingConfiguration.

The term "SSB" refers to an SS/PBCH block. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a special cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with CA. The term "Special Cell" refers to the PCell of the MCG or the PSCell of the SCG for DC operation; otherwise, the term "Special Cell" refers to the Pcell.

FIGS. 12-14C show example embodiments of the systems of FIGS. 1-11 that are configured to multiplex of transmissions with different reliability and/or latency requirements.

As described herein, at least some wireless communications systems (e.g., systems implemented using 3GPP 5G NR radio access technology) support the coexistence of diverse services and traffic communication in a common carrier. As different services may have different requirements and characteristics, multiplexing techniques may be used to facilitate the efficient and reliable transmission of packets on a wireless recommunication network.

This disclosure describes UL multiplexing of transmissions with different reliability and/or latency requirements. As an example, this disclosure describes how one or more indications of impacted resources can be conveyed to one or more UEs so that ongoing or imminent UL transmission can be adjusted in order to avoid adversely impacting other UL transmission that may occur in shared resources. As another example, transmission of one service type may be more urgent than the other, and may be prioritized over other ongoing transmissions.

This disclosure describes several UE-specific downlink control channel signaling mechanisms and corresponding configurations to indicate UL transmission cancellation.

UE-specific downlink control information (DCI) signaling may cater to individual requirements and resource assignment. Subject to time-frequency granularity of indication of impacted resources, group common signaling may, in at least some implementations, unnecessarily trigger one or more UEs to cancel part of their transmission although their assigned resource do not overlap with the resources of more urgent transmission.

This describe describes several UE-specific indication mechanisms that enable UL transmissions to be made in shared resources, either in an orthogonal or non-orthogonal manner. Orthogonal transmission refers to the case in which multiple transmissions are made in overlapping time-frequency-code resources. Orthogonal transmission refers to the case in which at least one of time resource, frequency resource, code is overlapping or is common between multiple transmissions.

First, this disclosure describes UE-specific control channel signaling, in particular DCI format content design and configurations, to convey UL transmission cancellation indication to a UE. Second, this disclosure describes the case when UE can be triggered by a power control parameter as function of an active bandwidth (BW) part. Third, this disclosure describes how a configured radio network temporary identifier (RNTI) can be used for UL grant, where one or more transmission parameters are implicitly obtained based on the detected RNTI.

Unless mentioned otherwise, the durations discussed here can refer to one or more slots, one or more symbols, or a combination thereof. Further, UL coexistence may occur in licensed and unlicensed band either below or above 6 GHz, frequency division duplex (FDD) and time division duplex (TDD) systems, and in any bandwidth part of a given numerology, such as 15 kHz, 30 kHz, 60 kHz, 120 kHz, etc. Note that a UL transmission cancellation indication can be alternatively called UL transmission interruption indication or UL transmission preemption indication. CORESET can refer to a downlink (DL) control resource set, which may include a group of contiguous/non-contiguous physical resource block (PRBs) and a group of symbols, and a CORESET can include one or more search spaces where DL control channel signaling, such as UL transmission cancellation indication or UL grant, can be monitored and/or detected.

Although the examples herein at described in the context of UE-specific indications (e.g., an indication specific to or unique to a particular UE), similar physical downlink control channel (PDCCH) monitoring behaviors and/or search space set configurations can be used for group-common indication as well (e.g., an indication common to multiple UEs). For example, a UL cancellation indication can be a group-common indication, in a DCI (e.g., in a PDCCH), or using a sequence.

Indication of UL Transmission Cancellation

In some implementations, a UE may not need to monitor for any UL cancellation indications before receiving an UL grant for PUSCH transmission. Instead, a UE may be configured to monitor for one or more UL grant cancellation indications upon successful detection of a UL grant. This disclosure describes example embodiments for activation, configuration, and content design of such transmission cancellation indications. The examples herein are described in the context of PUSCH transmission cancellation. However, similar techniques can be used in the context of other ongoing or imminent UL transmissions, such as physical uplink control channel (PUCCH), physical random access channel (PRACH), and sounding reference signal (SRS), after the UE is triggered for such transmission, either semi-statically or dynamically or by a combination of such signaling.

Activation of Monitoring UL Cancellation Indication

In some implementations, a UE can be configured by radio resource control (RRC) signaling to monitor for a UL transmission cancellation indication (UL_CI). For example, a higher layer parameter (e.g., UL_CI=ON or OFF) can be used to activate monitoring of a UL preemption or a cancellation indication after a UE receives the grant (e.g., successful decoding of the DCI). In some implementations, such characterization may require considerations regarding the UE processing time (e.g., DCI decoding time), such as the N2 being the number of orthogonal frequency division multiplexing (OFDM) symbols required for UE processing from the end of PDCCH containing the UL grant to the earliest possible start of the corresponding PUSCH transmission from the perspective of the UE.

In some implementations, a UL grant in a PDCCH can contain a data field to trigger monitoring for one or more UL transmission cancellation indications. For example, a bitfield in the PDCCH containing the UL grant can be 1 or 0 (or vice versa) to indicate that the UE is to monitor for a UL_CI or not monitor for a UL_CI, respectively.

Monitoring of Cancellation Indication:

In an example implementation, during a first phase, a UE receives a UL grant (e.g., an indication that the UE has been granted permission to transmit data using particular network resources of a wireless communications network). In a second phase, the UE monitors for the wireless communications network for one or more UL_CIs. In this example, monitoring for UL_CI(s) can be triggered following receipt of an indication of a grant of PUSCH. In some implementations, a UL_CI can be received in a UE-specific DCI in a PDCCH. In some implantations, a UL_CI can be received in a UE-specific PDCCH generally.

In some implementations, monitoring for UL_CI(s) may be performed over a window following the UL grant. In some implementations, the window can include M≥1 monitoring occasions for the UL_CI(s). The position of first occasion can be obtained as a offset from when the UL grant was received. A parameter T5 can be identified (which can be measured in symbol(s) or slot(s) or a combination for a given numerology) which indicates the location of first monitoring occasion of UL_CI(s), as an offset from a known reference point which can be beginning or end of CORESET where UL grant was detected or from the boundary of the slot where UL grant was detected.

Figure 12:
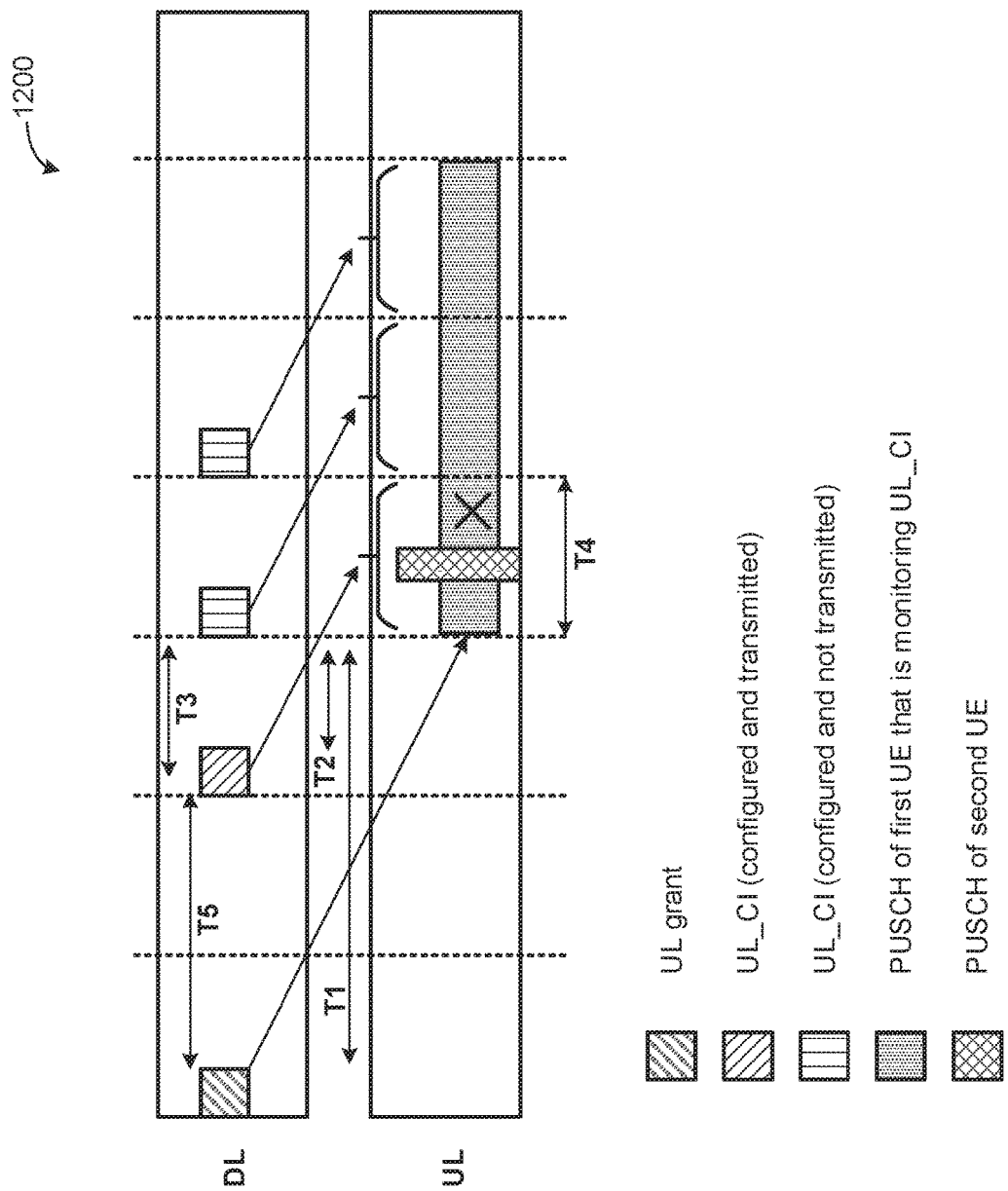
FIG. 12 is a block diagram of an example timeline for monitoring a wireless communications network for a UL cancellation indication

For example, FIG. 12 shows an example timeline 1200 for monitoring a wireless communications network for a UL cancellation indication. The timeline 1200 includes a downlink portion (e.g., indicating the timing of transmissions from the wireless communications network to a UE) and an uplink portion (e.g., indicating the timing of transmission from the UE to the wireless communications network). In this example, the parameter T5 can be measured from the end of the CORESET where a UL grant was received to the beginning of the CORESET where the first UL_CI is monitored. In some implementations, T5 can be indicated as (number of slot(s)−1)*$N_{symb}$+starting symbol in a slot, where the number of slot(s) is counted from where the UL grant was received and starting symbol is where first symbol of the CORESET for monitoring UL_CI is located. One or more parameters related to the indication of T5 (e.g., a number of slots offset from where the UL grant was detected or starting/first symbols of the CORESET where the first UL_CI is monitored) can be included in the UL grant and/or configured by a higher layer. Here, $N_{symb}$ denotes the number of symbols in slot of a given numerology, and may be 14 for the case of normal cyclic prefix (NCP) and 12 for the case of extended cyclic prefix (ECP).

In some implantations, the UE can monitor for UL_CI(s) with a periodicity after the first monitoring occasion of UL_CI. A parameter T3 can be identified which can be used as the monitoring period for monitoring successive occasions of the UL_CI(s). T3 can be measured in symbol(s) or slot(s) or a combination thereof for a given numerology. Parameter T3 can be higher-layer configured, or can be implicitly obtained based on the time gap between the end of the UL grant and the end of the scheduled PUSCH or duration of scheduled PUSCH.

In some implementations, the parameter M can be higher-layer configured or can be derived implicitly from the time gap between the end of the UL grant and the end of the scheduled PUSCH or from the duration of scheduled PUSCH.

In some implementations, a UE may receive an indication of a longer transmission duration for the PUSCH. For example, a UE may receive a transmission with a specific PUSCH mapping type (e.g., mapping type A in specifications), where the starting symbol is symbol index 0 in a slot and length of PUSCH is at least 4 symbols up to 14 symbols. More generally, if configured (e.g., by higher layer signaling), UEs with a PUSCH duration longer than J symbols may monitor for UL_CI(s) following a UL grant, where J can be an integer, J={2, 3, 4, 5, 6, 7, 8, 9, 10, 12, 13, 14}. In some implementations, time-partitioning of the PUSCH duration can be obtained (e.g., L≥1 time parts) and one UL_CI may address one time partition of the PUSCH. A UL_CI addressing a time partition may indicate all of the scheduled resource within the time partition to be cancelled or a portion of it. In some implementations, each time partition can be further divided in frequency (e.g., J≥1 frequency parts). For instance, the PUSCH BW can be divided into J parts for each time partition. The frequency parts can be counted from top or bottom of the PUSCH BW. Each UL_CI, if detected, notifies the UE of cancellation of all or part of the time part.

In the example shown in FIG. 12, a UE receives an UL grant which indicates that PUSCH is to start after a time T1 from when the UL grant was received. In this example, T1 is measured from the end of the CORESET where the UL grant was detected to the beginning of the PUSCH. Alternatively, T1 can be measured as (number of slot(s)−1) *$N_{symb}$+starting symbol in a slot, where the number of slot(s) is counted from where the UL grant was received and starting symbol is the first symbol of the PUSCH. In the latter example, the number of slot(s) offset and/or the starting symbol of PUSCH can be dynamically indicated in the UL grant or configured by a higher layer.

If the UE is configured or indicated as described above, the UE starts monitoring for UL_CI after a T5 duration following detection of the UL grant. The PUSCH duration is divided into L=3 parts. The UE monitors UL_CI at M=L=3 occasions. The periodicity of the monitoring for UL_CI is T3. The application time after detecting UL_CI is identified as T2. T2 can be same, larger, or smaller than the UE processing capability N1 or N2 (e.g., as identified in the 3GPP R15 specifications).

In this example, the UL_CI is detected in the first occasion, which triggers the UE to cancel transmission in the first time of the allocated resource of PUSCH. The UL_CIs are not transmitted in following occasions, meaning that the UE can continue transmission of the PUSCH in the remaining time parts.

In some implementations, the duration of each time part T4 may or may not be equal to monitoring period T3.

In some implementations, the parameter T5 can be implicitly obtained from the parameter T1 or one or more parameters defining T1, such as the number of slot(s) offset from the slot where the UL grant was received (this may be identified as the K2 value in the 3GPP technical specifications). IN some implementations, each of the parameters T1, T2, T3, and/or T5 can be same as or larger than the minimum UE processing time for PUSCH preparation procedures (e.g., they can be subject to the capabilities of the UE).

In some implementations, a UE can monitor for UL_CI(s) in UE-specific or group-common search spaces associated with one or more CORESETs. Search parameters (e.g., the monitoring periodicity, monitoring offset of UL_CI(s), etc.) can be configured as part of one or more search spaces associated with one or more CORESETs in a given DL BWP. However, in some implementations, monitoring is active only when an UE has an imminent or ongoing UL transmission. In some implementations, a UE may monitor for UL_CI(s) with K=>1 aggregation levels. In one example, as part of higher layer parameter search-space-config, a UE can be configured as follows:

The DCI format can be associated with the search space, based on whether it is UE specific search space or common search space. In the case of a UE-specific search space, a higher layer parameter USS-DCI-Format indicates to the UE to monitor a PDCCH for a given DCI format that contains UL_CI(s). in the case of a common search space, a higher layer parameter RNTI-monitoring may indicate to the UE to monitor a PDCCH with the RNTI used for a given DCI format that contains UL_CI(s).

The number of PDCCH candidates is defined according to the supported aggregation levels.

The PDCCH monitoring periodicity can be defined in terms of symbols or slots, or a combination thereof (e.g., T3).

The PDCCH monitoring offset can be defined in symbols or slots, or a combination thereof (e.g., T5 or a number of slots in the calculation of T5, see the example described above for the calculation of T5).

The PDCCH monitoring pattern within a slot (e.g., a location of a first symbol of a CORESET within a slot) can be defined (e.g., the pattern can be used to identify a starting symbol of the CORESET in calculation of T5.

Note that monitoring for UL_CI(s) can be triggered based on events, such as if UE receives an UL grant. Hence, although monitoring configuration, in one example, can be obtained as part of search space configuration associated with one or more CORESET(s) in a DL BWP, the UE does not always actively monitor based on the parameters. For example, the PDCCH monitoring offset in the configuration for a UL_CI may be separate from other PDCCH monitored in the search space. In the context of PDCCH, the monitoring offset may indicate a time offset between reception of a UL grant and the beginning of a CORESET that is being monitored for UL_CI(s) (e.g., T5 in FIG. 12). In some implementations, offset may only indicate a number of slots from where the UL grant was received, and if the starting symbol(s) of the CORESET containing the UL_CI is not symbol #0 in a slot, the PDCCH monitoring pattern within a slot can be utilized to identify the location of the first symbol of the CORESET that is being monitored for UL_CI(s).

In some implementations, a UE may monitor for UL_CI(s) in the same or a different CORESET from where it received the UL grant that scheduled the transmission.

In some implementations, the scheduled PUSCH duration can include one or more repetitions. An implicit way to trigger the UE to monitor for UL_CI(s) is if repetition number K exceeds a given/configured value. For example, if K is equal or larger than 2, UE may be triggered to monitor for UL_CI(s).

The monitoring configurations discussed herein are applicable to any DCI format that contains UL_CI(s).

DCI Format Design

In some implementations, a UE-specific DCI scrambled by a cell radio network temporary identifier (C-RNTI) or another configured RNTI can be used for a DCI format containing UL_CI(s). As an example, one or more reserved fields can be used in a UL grant (e.g., in DCI format 0_0 or 0_1), which can be used for the UL_CI(s). For instance, one bit field can be used, where a value of 1 (or vice versa) indicates that a certain time-frequency portion or all of the PUSCH should be cancelled by the UE. Thus, if that bit-field contains a given value that triggers cancellation, one or more of the rest of the fields in the DCI format may not be valid (e.g., such DCI format may not assign any resource allocation). For instance, in the context of FIG. 12, for each of the L parts, the UE monitors for the UL grant, whether the bit-value in the field indicates cancellation or not.

In some impetrations, a DCI format for UL_CI can be scrambled with a different RNTI than that is used for a UL grant. The UE may monitor for a UL grant or any other DCI format, such as a compact DCI format with the RNTI for one or more occasions. Thus, detection of an identified DCI format with the configured new RNTI can indicate cancellation of part or all of the PUSCH scheduled by the original UL grant. For instance, in the context of FIG. 12, detection of DCI with the given RNTI indicates cancellation for first part, whereas for second and third time part, no DCI sent. The content of the DCI is not valid.

In some implementations, value of L and J can be configured by a higher layer. In some implementations, the value of J and L can be implicitly derived from a set or number of PRBs and a number of symbols scheduled, respectively. A higher-layer configured table can be used for the UE, where the UE can obtain values of J and/or L based on a range of values for the number of PRBs and a range of values for the number of symbols. As an example, a table such as the following can be used:

| Value of L | Range of PUSCH duration (symbols) |
|---|---|
| 1 | 1 to 4 |
| 2 | 5 to 8 |
| 3 | 9 to 12 or 14 |

In some implementations, the value of L and J can depend on numerology. The UE can obtain the configuration for the values of L and J based on the active BW part.

In some implementations, the DCI format for a UL_CI can contain a bitmap of X*Y bits, where $X \geq 1$ indicates number of time partitions within each time part, and $Y \geq 1$ indicates number of frequency parts. The time and frequency granularity can be configured by a higher layer or implicitly obtained from allocated resource of the PUSCH. In FIG. 12, X=1 and Y=1 is assumed. X and Y can be configured or obtained in a numerology-specific manner (e.g., depending on active BW part).

In some implementations, a compact DCI format can be bed for a UL_CI. A UE can monitor for the compact DCI with C-RNTI or any other configured RNTI. In some implementation, the compact DCI can indicate one or more of the following elements:

Header/flag if multiple DCI format have same size
A field containing $XY \geq 1$ bits, to indicate which area to cancel transmission
  May be a bitmap including X*Y bits
HARQ ID
  In case the UE may have multiple UL transmissions occurring in parallel
Carrier indicator
BWP indicator
Zero padding In some implementations, one or more of a new data indicator (NDI) bit field, a hybrid automatic repeat request (HARQ) identifier (ID) bit field, a modulation and coding scheme (MCS) indication field, a time/frequency resource allocation field of a UL grant, such as a DCI format 0_0 or 0, can be used to identify that the DCI is in fact indicating a transmission cancellation, rather than a grant. For example, for a given HARQ ID, if the NDI bit is toggled, this may refer to a new transmission. However, certain set of entries of the MCS table can be reserved for retransmission (e.g., MCS with indices 28-31, as described in 3GPP Technical Specification (TS) 38.214. In this example, one of those reserved entries for the MCS can be indicated while the NDI bit can be toggled for the same HARQ process ID, which may serve as a notification of a UL_CI for the packet scheduled with the HARQ process ID. The time/frequency resource allocation bit-fields can be used for indicating which time/frequency area to cancel transmission, and can span physical resources beyond the earlier allocated PUSCH. Accordingly, the UE may be expected to cancel all UL transmissions that overlap with the resource region identified by the resource allocation information in the UL_CI. In one example, if a time/frequency resource allocation uses a total of $L \geq 1$ bits, then $K \leq L$ bits can be used for the cancellation indication. As further examples, either the time and frequency domain random access (RA) bit-fields could be combined and re-interpreted to determine the time-frequency resources for cancellation or the time and frequency domain RA fields be interpreted as for a regular UL grant.

Rescheduling Revised Grant for Same HARQ Process ID

In some implementations, a new physical channel or DCI format design may not be necessary to implement a UL_CI. For example, a first UL grant can schedule a packet with a certain status of the NDI bit for a given HARQ process. If the UE receives a subsequent UL grant for the same HARQ process with either the same or a different NDI bit status over a configured window or set of monitoring occasions (either before or during the ongoing PUSCH transmission scheduled by first UL grant), UE may drop the ongoing transmission and instead follow the updated grant for the same HARQ process.

In essence, this approach "shifts" the PUSCH resource allocation (e.g., to a later time), or alternatively updates the UL grant with a new resource allocation. The updated grant can also be referred to as revised or rescheduling grant.

In the context of this example, a subsequent grant can function as both a cancellation of an earlier granted transmission and the granting and scheduling another transmission. Further, if the UE has been configured with repeated transmissions by an earlier configuration, such subsequent grant function as a repetition cancellation, as well as a granting and scheduling of a new transmission. The UE can be configured to monitor for the subsequent UL grant at one or more occasions. If the subsequent grant is not received within the configured number of occasions, the UE can continue with the existing operation or follow the original grant. A configured number of occasions can be obtained by configuring a time window or duration that includes the occasions.

Although the network scheduler may transmit the original grant flexibly at any time, in some implementations, the transmission occasions of the revised grant and the frequency by which the network can send such a revised grant may not be the same as when the UE monitors for the first grant.

In some implementations excessive delay in terms of the UL grant reception and UL transmission can be avoided. This can be particular beneficial, for example, for UEs supporting low latency traffic, while accounting for the required processing time by the UE to detect and take action on the revised UL grant.

Accordingly, in some implementations, the UE can monitor for a potential subsequent updated grant (e.g., with a finer monitoring granularity and within a time window) upon detection of an UL grant. Such monitoring periodicity, as well as the time window duration, can be configured or predefined, and may be obtained as a function of the original (e.g., prior to reception of the UL grant) monitoring occasion periodicity, symbols, slots, etc. Alternatively, the window length can be determined based on the scheduled PUSCH duration (or scheduled duration of multiple PUSCHs, in the case of configured repetitions). For instance, the UE may or may not monitor after the PUSCH transmission(s) end. As yet another alternative, the time window duration may be configured to the UE as part of search space set configuration via higher layers (e.g., via UE-specific RRC signaling).

In some implementations, if the network configures the UE with a fine monitoring granularity (e.g., without any change before and after the reception of the grant), the UE may be burdened with unnecessary frequent monitoring (e.g., when no rescheduling needs to be performed). Proper selection of the window length and monitoring prosperity can reduce this burden.

In some implementations, the UE can be configured with a monitoring periodicity for general scheduling transmission, as well as an additional set of DCI monitoring configuration parameters corresponding to the potential rescheduling operation. These additional configurations may be activated/triggered based on an event (e.g., reception of an UL grant), and may be associated with a particular search space set configuration.

In some implementations, the PDCCH monitoring periodicity, offset, and pattern within a slot can be indicated as part of the configurations for a given search space set. The rescheduling grant may then be monitored in a same or different search space set than the search space set in which the original grant was received. In some implementations, this can be performed according to one or more additional parameters (e.g., a different monitoring periodicity) based on a triggering event, when the UE is monitoring for a rescheduling grant.

As an example, a given search space and CORESET may have two monitoring periodicities. One periodicity can be used as the default monitoring periodicity, and the other periodicity can be triggered or activated if certain event(s) (e.g., the reception of a scheduling grant) occur. The additional set of parameters can include a different monitoring periodicity, offset, or pattern relative to the original UL grant.

In some implementations, the monitoring parameters and configurations can be configured semi-statistically. In general, a search space monitoring configuration may be updated dynamically. In some implementations, such dynamic update may not require any dynamic indication and can be activated and/or deactivated implicitly.

In some implementations, the dynamic updating of a search space monitoring configuration may enable a UE to monitor different numbers of candidates during each monitoring occasion. In some implementations, the UE can monitor a subset of candidates more frequently than others.

In some implementations, this additional monitoring behavior can only be triggered upon detection of a valid UL grant scheduling data transmission in the UL.

In some implementations, the minimum PUSCH preparation time for the subsequent UL grant can depend on the UE processing time capability and the UE implementation. For example, the minimum PUSCH preparation time can depend on the time required by the UE to detect and decode the revised grant, as well as the time the UE requires to take action on it, such as the cancellation of earlier grant and PUSCH preparation and transmission according to the revised grant. As another example, the UE implementation can be specified, at least by N2 defining the number of OFDM symbols required for UE processing from the end of PDCCH containing the UL grant to the earliest possible start of the corresponding PUSCH transmission from UE perspective).

In some implementations, the activation of additional UE monitoring upon reception of an UL grant may also be extended to the case of a UL updated grant for different HARQ process IDs. Accordingly, depending on the HARQ process, if the latter is a rescheduling grant with the NDI not being toggled compared to the first grant, the UE can cancel transmission of the PUSCH corresponding to the previous grant.

In some implementations, the UE may continue to transmit PUSCH according to both grants for the same HARQ process, regardless of the NDI toggling stage, as long as the PUSCHs are time divisional multiplexed (TDM-ed) (e.g., there is no time-domain overlap between the resource allocations by the first and second grants). Accordingly, the UE can follow the scheduling grants, and can proceed with the transmissions, where each grant follows its own HARQ timeline.

Search Space Set Configuration

As discussed above, one aspect of updating and/or rescheduling of a grant is the dynamic adaptation in UE monitoring behavior. Example techniques for implementing dynamic PDCCH monitoring, where the monitored PDCCH may alter, update and/or cancel resource assignment by a previous PDCCH, are described below.

In these examples, an assumption is that a UE is configured with S search space sets in a given DL BWP, where each search space set is indexed by s. A UL cancellation indication UL_CI or an updated grant/rescheduling grant can be configured to be transmitted on at least one search space set. The DCI format for a UL cancellation or rescheduling grant can be referred to as a DCI format x-y, where x can be 0 (e.g., as chosen for UL grants in the 3GPP technical specifications), and y can be 0 or 1. Alternatively, x can be 2 if transmitted in a common DCI in a PDCCH (e.g., as chosen for common PDCCH in some such as in the 3GPP technical specifications) and y=>1 can be integer (e.g., y can be 1 or 4). If y=1, it may imply that a DL pre-emption indication DCI format 2_1 can be reused for UL cancellation, as well. Further, the size of the DCI format could be one of: (i) the same as the DCI format 00, (ii) the same as the DCI format 2_1 if the latter is configured in the same search space, and (iii) as configured by UE-specific RRC signaling.

In a first example, for a search space set s where a UE can monitor for a UL_CI or a rescheduling grant, the UE can be provided an indication by a higher layer parameter dci-Formatx-y as part of SearchSpace higher layer configuration. If the indication is present, the UE can monitor for a DCI format x-y in the search space set s.

In a second example, a UE can monitor the search space set s (e.g., for DCI format x-y) only after a trigger has occurred. Example triggers include a detection of a valid UL grant or starting from a specified number of symbols (Ns) preceding certain UL transmission opportunities. This can include one or more of Types 1 or 2 cell group (CG) PUSCH transmissions, sounding reference signal (SRS) transmissions, or PUCCH transmissions based on semi-static configurations (e.g., for Scheduling Request (SR), periodic or semi-persistent CSI feedback).

For example, the monitoring pattern within a slot can be configured for the search space set s by a higher layer parameter monitoringSymbolsWithinSlot. In addition, the UE may also be provided with a higher layer parameter duration (or monitoring window) for search space set s, where duration can be indicated in slots or symbols. Note that this parameter duration may be same or separately configured from the duration parameter that can be optionally configured for a common search space (CSS) in the 3GPP Rel-15 NR technical specifications. A monitoring offset can be used to indicate where the duration starts. In one example, the search space set s may also be configured with a periodicity. However, in this example, the periodicity may not be used for monitoring for UL_CI(s) or rescheduling grant(s). In other words, the UE may monitor for the DCI format x-y in the search space set s for only over a duration, not periodically. Alternatively, the UE may monitor for the DCI format x-y in the search space set s according to the configured monitoring periodicity, but within the time defined by the duration parameter.

Figure 13:
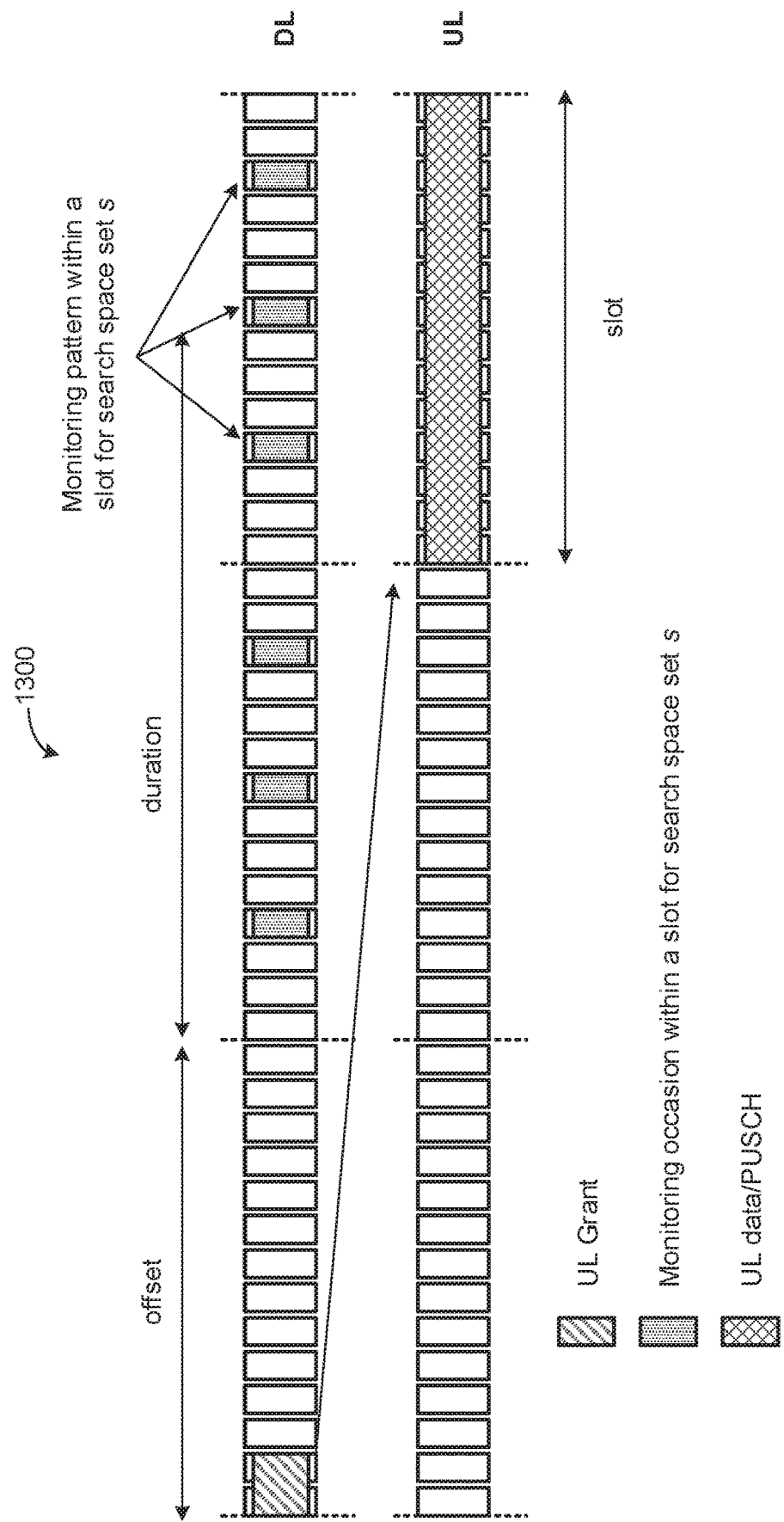
FIG. 13 is a block diagram of an example search space set s.

FIG. 13 shows an example search space set s with respect to a timeline 1300. The timeline 1300 includes a downlink portion (e.g., indicating the timing of transmissions from the wireless communications network to a UE) and an uplink portion (e.g., indicating the timing of transmission from the UE to the wireless communications network). In this example, the search space set s is configured according to a monitoring pattern within a slot (e.g., every fourth interval within a slot). Further, the search space set s is offset from a reference point (e.g., illustrated by the span "offset"), and has a defined duration. The UE can monitor for UL_CI(s) or rescheduling grant(s) in accordance with the search space set s (e.g., to limit the scope and/or frequency of monitoring to a subset of the network resources).

In a third example, once a UE detects a DCI format x-y in one of the monitoring occasions in the search space s, the UE can skip monitoring for the remaining occasions within the slot. In some implementations, the UE can skip monitoring for the remaining occasions for the search space set s within the duration.

In a fourth example, the UE can only monitor the search space set s based on a trigger, such as the receipt of an assignment from the network. In some implementations, the intended search space set s can be indexed lower than other existing search space set indices, such that the UE attempts the monitor the search space set s with higher priority. This is because each search space set may have a given number of PDCCH candidates, and a UE may not exceed a total number of blind detection attempts within a slot over all the search space sets configured for the UE. In some implementations, if the search space set s is used in an on-demand basis, it may be identified as a higher priority search space set (e.g., regardless of the search space set index). If needed, one or more other search space sets can be included in a given slot. This can be realized, for example, by configuring additional flags or parameters to the search space set configuration. In some implementations, the search space set s can also be used for monitoring other DCI formats, as well with a periodicity. However, if a trigger is received, the UE may monitor the search space set s in successive slots (although it may have a periodicity that is larger than a slot). The parameter duration may only be used if a trigger is received. Otherwise, the UE can follow the search space set s configuration with periodicity.

In some implementations, the duration of the search space set configuration may be active only following receiving an assignment, such as a grant. A UE may still monitor the search space set s following a configured periodicity. As an example, the search space set s can have a periodicity of K=5 slots, and a duration of 2 slots. In this example, a UL grant is received in a DL slot n corresponding to an UL transmission that starts in UL slot n+K2, where K2 indicates the time between the UL grant and the UL data transmission. K2 can be can be expressed in slots or symbols (e.g., K2=2 slots). In some implementations, the offset to the start position of the duration can be obtained based on a UE processing time of NR PDCCH (e.g., a minimum UE processing time). A parameter N3 can be identified to define the PDCCH processing time in slot(s) or symbol(s), for a given numerology. N3 can be smaller than N2, which is the number of OFDM symbols required for the UE for processing, from the end of NR-PDCCH containing the UL grant to the earliest possible start of the corresponding NR PUSCH transmission from the perspective of the UE. N3 can be a UE capability parameter, and can be reported by the UE (e.g., as part of RRC connection setup). In some implementations, the duration may start after an offset of one slot (e.g., from DL slot n+1 and end at slot n+2). UE may monitor the search space set s according to a pattern (e.g., as given by a parameter monitoringSymbolsWithinSlot or a separately configured parameter within the slots n+1 and n+2. The UE may resume monitoring the search space set s again in the next configured periodic occasion. However, in some implementations, the duration parameter may only be used following an assignment (and in some cases, may not always be used). Note that, here, part of the search space set configuration is dynamically indicated/activated, which is different from fully-semi-static search space set configuration (e.g., as called for in some 3GPP technical specifications).

In some implementations, the search space set s may not be configured with a duration for monitoring the search space set s. Instead, the UE may implicitly obtain the duration for monitoring the search space set s following the trigger. As an example, depending on the length of PUSCH transmission, the UE may identify where the duration ends. As another example, the UE may monitor the search space set s after an offset with periodicity of one slot according to the pattern given by parameter monitoringSymbolsWithinSlot, and does not monitor after UL transmission ends.

In some implementations, a number of blind decoding attempts and/or control channel elements (CCEs) for channel estimation within a slot can be dynamically increased following a trigger. A search space set s can be used when following a trigger, which may require a larger number of blind decoding attempts and/or CCEs for channel estimation within a slot compared to the existing numbers of blind decoding attempts and/or CCEs for channel estimation before the trigger was received. The UE may report in UE-NR-Capability if such behavior can be supported by the UE.

In some implementations, the UL grant shown in FIG. 13 can be replaced by a DL grant, and the UL data/PUSCH can instead be a PUCCH. In other words, similar monitoring behaviors can also be used if the UE is configured such that part or all of a PUCCH transmission (including any repetitions) can be cancelled/dropped following an indication.

In some implementations, the UE may not expect to monitor for cancellation indications to drop periodically configured UL transmissions, such as SRS or CSI feedback reporting in a PUCCH.

In some implementations, a UE configured with Type 1 or Type 2 UL configured grant may also monitor for UL_CI(s) or rescheduling grant(s) (or more generally, UL grant(s)) according to above described techniques. The offset to the start position of the duration or the start location of the monitoring occasions can be counted from a reference point, such as location in time preceding by a number of slots and/or symbols where the UL transmission with configured grant starts, or preceding by a number of slots and/or symbols the boundary of the slot where a transmission opportunity starts. Alternatively, for A Type 2 UL configured grant, the offset to the start position of the duration or the start location of the monitoring occasions can be counted from the slot where the DCI activating Type 2 UL configured transmission is received.

Which Transmissions May be Subject to Pre-Emption Cancellation and/or Rescheduling In at least some of the examples described herein, pre-emption/cancellation and/or rescheduling is described in the context of dynamically scheduled PUSCH transmissions. However, in some implementations, pre-emption/cancellation and/or rescheduling can also be performed in the context of other UL transmissions. Further, in some implementations, only certain transmissions may be subject to pre-emption/cancellation and/or rescheduling.

In some implementations, in the case of UL grant-free transmission (e.g., where the transmission opportunities are semi-statically configured) the gNB may cancel and/or reschedule some or all of the PUSCH transmission opportunities. In some implementations, in the case of UL grant-free transmission (e.g., where the transmission opportunities are semi-statically configured) the gNB may not cancel and/or reschedule some or all of the PUSCH transmission opportunities.

In some implementations, in the case of UL grant-free transmission, PUCCH transmission opportunities (e.g., another example of semi-statistically configured transmission opportunities) may be subject to preemption indications, cancellation indications, and/or a rescheduling indications. In some implementations, in the case of UL grant-free transmission, PUCCH transmission opportunities may not be subject to preemption indications, cancellation indications, and/or a rescheduling indications.

In some implementations, in case of a configured grant UL transmission (e.g., where the duration of each transmission opportunity is known), some certain thresholds may be defined, such that if a transmission duration is longer than the threshold, the UE is instructed to monitor for preemption indications, cancellation indications, and/or rescheduling indications. Accordingly, if a transmission occupies a relatively long duration, the UE may cancel that transmission and start a higher priority transmission.

As an example, in the context of PUCCH transmissions, depending on the duration of the configured PUCCH (e.g., long PUCCH formats), the UE may be instructed to monitor for any preemption, cancellation, and/or rescheduling indications.

In some implementations, short transmissions (e.g., when there is no repetition configured, SRS, or for short PUCCH formats) may not be subject to preemption, cancellation, and/or rescheduling.

Alternatively, it may be specified that only PUSCH transmissions, including both dynamically scheduled as well as Types 1 and 2 CG PUSCH, may be subject to preemption, cancellation, and/or rescheduling. Alternatively, only dynamically scheduled PUSCH may be subject to preemption, cancellation, and/or rescheduling. In some implementations, preemption, cancellation, and/or rescheduling can be limited to PUSCH transmissions with overall durations (including any repetitions) longer than 2 or 4 symbols. Similar rules as a function of the transmission duration may be applied to SRS, as well as to PUCCH transmissions.

In some implementations, rescheduling can be performed for both grant-based (GB) and grant-free (GF) UL transmissions. As such, as long as reference is made to the same HARQ PID, the UE can switch between these operations, and the GF UL transmission may be subject to the same rescheduling mechanisms as described herein earlier (while different scrambling RNTIs may be used for GB vs GF operations). As an example, a rescheduling grant may trigger the UE to switch between the GF and GB operations. Note that, if the UE is not already transmitting any information, use of a rescheduling grant may impose extra burden/overhead. Hence, in some implementations, other forms of indication may be preferred.

In some implementations, if the UE receives a rescheduling grant before it completes its current transmission in a GF operation, the GF PUSCH transmission opportunities can be overwritten by the GB transmission opportunities.

Unless otherwise mentioned, PUSCH can be based on dynamic grant or configured grant and can be canceled and/or dropped by a UL CI. A UL CI can be transmitted by a UE-specific DCI (e.g., a UL grant) or a group common DCI format.

In some implementations, a UL cancellation indication can be applicable to both dynamic grant-based PUSCH and configured grant PUSCH (e.g., type 1 or type 2). Alternatively, a higher layer configuration of configured grant PUSCH may include an identifier that a PUSCH based on configured grant is prioritized, even if a cancellation indication indicates a resource that overlaps with a PUSCH transmit occasion based on configured grant.

In some implementations, a UL grant such as format 0_0 or format 0_1 can include an indication in a data field (e.g., a 1 bit) specifying whether the corresponding scheduled PUSCH can be preempted or canceled, if a subsequent cancellation indication is received and indicates a resource that overlaps with that of the scheduled PUSCH. For example, a bit value 0 may indicate that the transmission is prioritized and may not be preempted and/or canceled by another L1 signaling such as UL grant or cancellation indication, or vice versa.

In some implementations, if the UE determines that a first PUSCH is prioritized and/or may not be canceled by another L1 indication, and/or if there is no other scheduled PUSCH that is not prioritized (e.g., either via indication in UL grant or higher layer configuration) exists within a configured or identified duration following the DCI that scheduled first PUSCH, the UE does not monitor for cancellation indications at least until or near the end of the scheduled first PUSCH. As an example, the duration can start after the UL scheduling DCI that scheduled the first PUSCH and can end at the end of the first PUSCH+Ta. In some implementations, Ta can be the cancellation time (e.g., as indicated by the cancellation indication), or an N2 or higher layer configured minimum value of K2 (e.g., the time offset between the UL grant and the PUSCH).

In some implementations, if monitoring is turned ON (e.g., either via a higher layer configuration or based on indication in a grant), the UE may increase its monitoring activity and/or budget. In some implementations, the UE may only monitor for the UL CI over a configured or identified monitoring duration or period (e.g., following an UL grant or a higher layer configuration). In some implantations, one or more of following options can be considered:

Activation of a SSset s, for higher layer configured duration, a duration of $T_{p,s}$ indicating a number of symbols/slots that the search space set s exists, for a configured monitoring duration and/or pattern. For example, the UE can receives a UL grant in symbol 0 in slot n, start monitoring for a preemption indicator from symbol k>0 in slot n, every p>0 symbols, until symbol m=>0 of slot n+d, d>0.

The start position of the duration may be configured or implicitly obtained based on offset between the UL grant and the PUSCH.

The SS Set can be activated in an aperiodic manner (e.g., only monitored when the UE is expecting a cancellation indication).

Alternatively, SS Set configuration of 3GPP R15 can be used. In some implementations, the UE may only monitor the SS Set that is configured with the DCI format of the cancellation indication or the UL grant that can cancel a transmission during when the monitoring duration or period is active.

Alternatively, the UE can prioritize the SSet(s) that are associated with the DCI format of the UL CI over others for a given budget of maximum number of PDCCH candidates monitored, when the monitoring duration of UL CI is active.

In some implementations, the code block group transmission information (CBGTI) field in a UL grant scheduling initial transmission can be used to indicate that all of the transmissions of that HARQ process indicated in the UL grant is protected/prioritized and may not be canceled or dropped.

In some implementations, activation of monitoring for UL CI can be implicitly obtained based on length of the PUSCH. For example, if the scheduled or configured PUSCH duration/length is less than K symbols, the UE can expect that the transmission would not be canceled or dropped. In some implementations, K={4, 7, 14} symbols for a given numerology.

In some implementations, a rescheduling DCI (e.g., an UL grant), such as fall back or non-fall back DCI(s) (including new DCI format if introduced) for UL scheduling may be used for UL cancellation (e.g., with NDI bit not toggled). In some implementations:

The UE may drop one or more of the PUSCH occasions/repetitions after the application/preparation time (e.g., Tproc,2 time (contrast 3GPP TS 38.214) from the end of the PDCCH carrying rescheduling DCI, where the PUSCH transmission is identified by the HARQ PID used in the rescheduling DCI.

The UE may drop a part of a PUSCH transmission if the application time corresponds to a middle of the PUSCH transmission.

The UE may drop the first PUSCH occasion/repetition after the application/preparation time, Tproc,2 time from end of the PDCCH carrying rescheduling DCI.

The UE may drop a part of the PUSCH transmission if the application time corresponds to a middle of the PUSCH transmission.

The UE may still continue transmission of the remaining part of the PUSCH transmission after cancellation or the remaining PUSCH repetitions.

In some implementations, if the UL-SCH indicator bit=0, the CSI request field=all zeros in the first UL grant (e.g., in the format 01) is received for a first HARQ PID (where the PID is indicated in the grant), this may indicate a cancellation of a UL transmission associated with first HARQ PID. The UL grant transmission with the UL-SCH indicator bit=0, the CSI request field=all zeros can be referred to as an empty grant (e.g., the UL grant does not schedule any transmission). In some implementations, if a UL transmission of the first HARQ PID was previously scheduled, the first UL grant can cancel the previously scheduled transmission and not reschedule any transmission for the HARQ PID. The UE may or may not flush the transmit buffer of the cancelled transmission for that HARQ PID. In some implementations, the NDI bit may not be toggled in the first UL grant, as this is not new transport block for the HARQ PID. In some implementations, the NDI bit can be a fixed value, or either toggled or not toggled, and UE can identify a cancellation of a previously scheduled transmission for a given HARQ PID based on the bit values of the UL-SCH indicator bit and the CSI request (e.g., if the UL-SCH indicator bit=0, CSI request field=all zeros).

In some implementations, if a UE receives a UL grant with the UL-SCH indicator bit=0, CSI request field=all zeros, UE can assume the UL grant is a cancellation indication and the UE can identify the time-frequency region for the UL transmission cancellation based on the time domain resource assignment and the frequency domain resource assignment fields. The UE can cancel one or more UL transmissions, including one or more subsequent/ongoing scheduled or configured grant PUSCH, SRS, PUCCH transmissions that overlap with the indicated time-frequency region. In this case, the UE can ignore the HARQ PID, as cancellation can be applied to a group of UL transmission that overlaps with the indicated region.

In some implementations, if an UL grant is received for a given HARQ PID at least Tproc,2 time before a PUSCH or first PUSCH repetition transmit occasion of the CG PUSCH for that HARQ ID, the UE can cancel the CG PUSCH transmission or first CG PUSCH repetition or all subsequent PUSCH repetitions and follow the assignment in the UL grant. In some implementations, if the UL-SCH indicator bit=0, the CSI request field=all zeros in the first UL grant (e.g., in the format 0_1) is received for a first HARQ PID (where the PID is indicated in the grant), it may indicate cancellation of the CG PUSCH UL transmission or first PUSCH repetition or all subsequent PUSCH repetitions associated with first HARQ PID, and the UE would not retransmit the PUSCH or PUSCH repetition. In some implementations, the UE only cancels the first PUSCH repetition (e.g., the next PUSCH repetition after indication of cancellation) and would still transmit the subsequent PUSCH repetitions.

In some implementations, a new UE-specific DCI format can be used for a UL CI, which may be received with a new configured RNTI or C-RNTI. The new DCI format can be size matched to a default or fall back DCI format. The new DCI format may or may not be a scheduling DCI. If the new DCI format is a scheduling DCI, the scheduling DCI can be an empty grant and the UE can identify a time-frequency area to be canceled based on the time and frequency resource indication (e.g., as described herein).

The new DCI format can have one or more of following configurable fields:

Header/flag (e.g., if multiple DCI formats have the same size)

A field to indicate which time/frequency region to be canceled/avoided

The field can contain XY≥1 bits, to indicate which area to cancel transmission.

The field can be a bitmap having X*Y bits, where X indicates the number of time partitions and Y indicates the number of frequency partitions within a configured region.

Coarse indication (e.g., 1 bit) that indicates whether to drop remaining PUSCH/repetition occasions or only those that were impacted The UE can identify the impacted PUSCH and/or repetition occasion based on a configured offset from the location of the DCI or identify the first PUSCH/repetition to be dropped after Tproc,2 from the time of the DCI.

CBG-level indication that indicates which CBGs to be dropped

Alternatively, the time/frequency region can be indicated by a typical time domain or frequency domain allocation in a grant.

HARQ ID or IDs

Carrier indicator

BWP indicator

Power control parameters (e.g., if UE needs to adjust transmit power in impacted area)

As an example, given two bits: the value 00 can indicate a cancellation, and the values 01/10/11 can indicate an adjustment of power on an overlapping transmission.

An indication whether to transmit uplink control information (UCI) (e.g., if the UCI was originally chosen to be multiplexed onto the overlapping PUSCH).

In some implementations, the UE can still transmit the UCI on the PUCCH, although the PUSCH would need to be dropped.

Zero padding

In some implementations, a group-common DCI format can be used for a UL CI, and can include one or more of the following:

A common field to indicate which time/frequency region to be canceled/avoided

The field can contain XY≥1 bits to indicate which area to cancel transmission

The field can be a bitmap include X*Y bits, where X indicates the number of time partition and Y indicates the number of frequency partitions within a configured region.

The time/frequency indication granularity can be configured.

The field can include a carrier-specific common field, each including XY bits.

In some implementations, X={1,2,3}, Y={1,2,3,4,5,6, 7}.

In some implementations, the time domain granularity can be from 1 to 14 symbols, the frequency domain granularity can be from ½, ¼, ⅛, or 1/16 of an active BW part.

A reference configured region can be group of contiguous symbols, and a group of contiguous PRBs.

UE specific fields with coarse indication

This field can include a coarse indication (e.g., 1 bit) in each UE spec field, indicating whether or not transmission to be canceled.

If not configured by a higher layer, the DCI format can include indicate an offset to start the position of the configured region in time (e.g., from the last symbol of the PDCCH carrying the CI).

In some implementations, if UL CI is transmitted in a GC DCI, then the UE can only cancel the PUSCH or the PUSCH repetitions overlapping with the indicated region and can still transmit the remaining PUSCH repetitions.

In some implementations, if a UE would multiplex a UCI onto a PUSCH in a slot and the UE receives a UL CI which indicates cancellation of the PUSCH, the UE can still transmit the UCI in the original PUCCH resource if the PUCCH resource does not overlap with the indicated time/frequency region to be avoided by the UL CI.

In some implementations, if PUCCH resource of a first UCI overlaps with first PUSCH and a second PUSCH in a slot and first PUSCH is located before the second PUSCH, the UE can multiplex a UCI onto the first PUSCH unless a UL CI is received that cancels first PUSCH, then the UE can multiplex a UCI onto the second PUSCH if does not overlap with the indicated region by the UL CI.

Power Control for Overlapping Transmission

In some implementations, a network may use a given bandwidth part in a carrier for an overlapping transmission of multiple service types. For example, a 60 kHz bandwidth part can be used, which may benefit low latency transmissions. In order to facilitate overlapping transmissions so that one or more of the overlapping transmissions are not adversely affected, a UE can receive an indication of certain parameters (e.g., a power control parameter), should the network expect subsequent overlapping transmissions. In other words, if overlapping transmissions are not expected, the UE can operate according to existing power control parameters, or according to other indicated power control parameters.

In some implementations, it may be resource intensive to dynamically indicate power control parameters to one or more UEs when overlapping transmissions involve infrequent "bursty" traffic spanning small duration. To this end, in some implementations, the UE can receive an indication of a power control parameter as part of BW part configuration, an independent configuration, other UL associated configuration, which can be turned OFF by default. The parameter value can be turned ON when such overlapping transmission is expected. In some implementations, the parameter can be indicated by UE-specific RRC signaling.

RNTI-Based Parameter Identification

In some implementations, a UE can be configured with one or more RNTIs, where the RNTI(s) can be used to scramble the cyclic redundancy check (CRC) appended to the DCI format. As an example, a UE can be configured with an RNTI A and an RNTI B. One or more parameters related to UL transmission can be implicitly obtained based on which RNTI is used. For instance, a first set of power control parameters can be assumed if the RNTI A is used, whereas a second set of power control parameters can be assumed if the RNTI B is used. In some implementations, the RNTI B can be used by the network with an UL grant when the grant provides resources in overlapping manner with other transmission, such that UE can use the appropriate power in order to control UL interference at the gNB, which may consequently affect one or more overlapping transmissions.

Figure 14A:
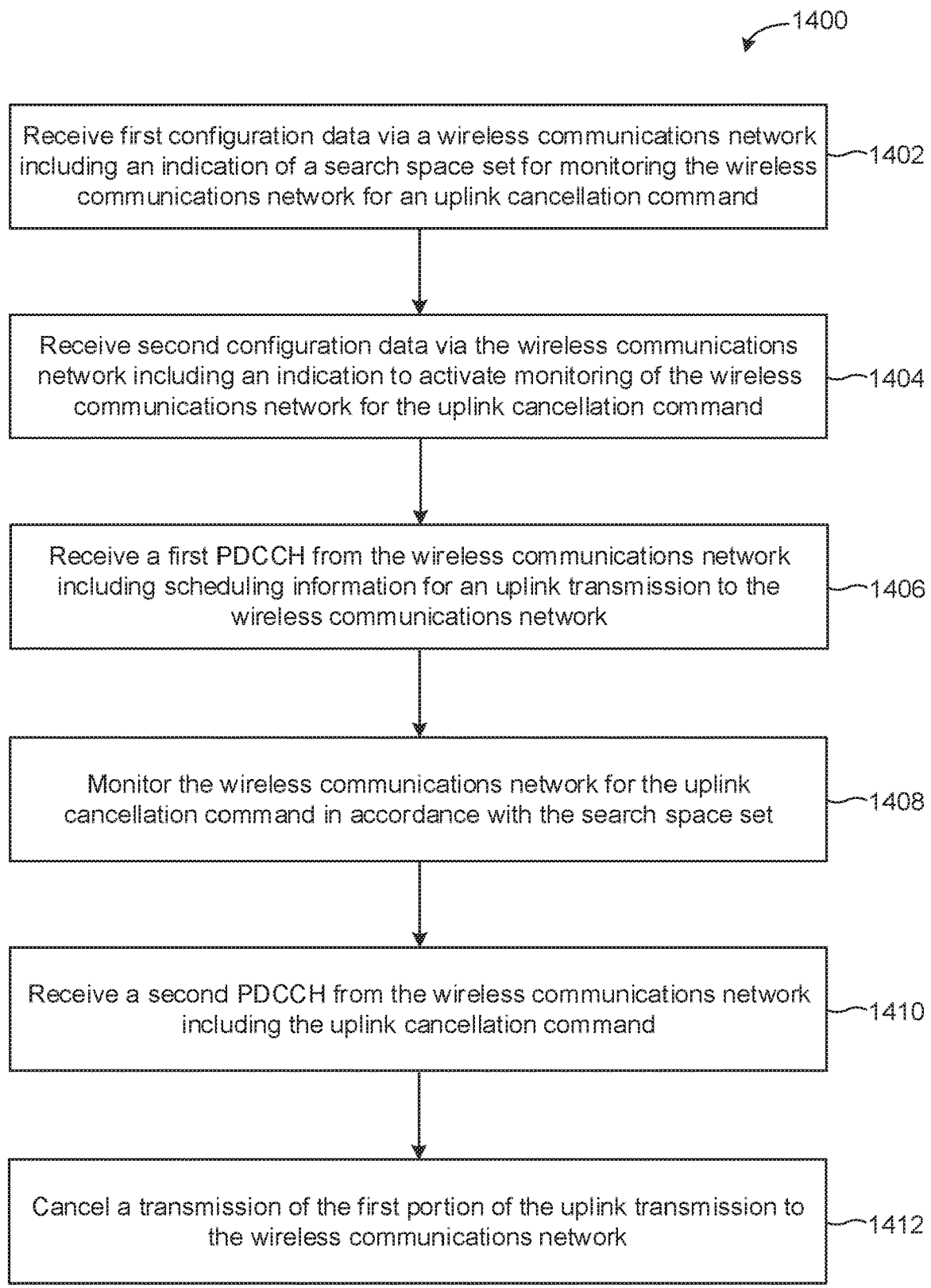
FIGS. 14A-14C illustrate example processes for controlling the transmission of data on a wireless communications network.

FIG. 14A is a flow chart that illustrates an example process 1400 for controlling the transmission of data on a wireless communications network. The process 1400 includes steps for execution by the electronic device(s), network(s), system(s), chip(s) or component(s), or portions or implementations thereof, of FIGS. 1-13, that may be configured to perform one or more processes, techniques, or methods as described herein, or portions thereof.

According to the process 1400, a user equipment (UE) receives first configuration data via a wireless communications network (step 1402). The first configuration data includes an indication of a search space set for monitoring the wireless communications network for an uplink cancellation command.

In some implementations, the UE can receive the first configuration data via radio resource control (RRC) signaling. In some implementations, the RRC signaling can be specific to or unique to the UE.

In some implantations, the search space set can be associated with a particular control resource set (CORESET) of the wireless communications network.

In some implementations, the indication of the search space set can include an indication of a duration for monitoring the PDCCH for the uplink cancellation command, an indication of a ?monitoring offset to a start position of the duration, an indication of a periodicity for monitoring the PDCCH for the uplink cancellation command, and/or an indication of a monitoring pattern.

The UE receives second configuration data via the wireless communications network (step 1404). The second configuration data includes an indication to activate monitoring of the wireless communications network for the uplink cancellation command.

In some implementations, the UE can receive the second configuration data via RRC signaling. In some implementations, the RRC signaling can be specific to or unique to the UE.

The UE device receives a first physical downlink control channel (PDCCH) from the wireless communications network (step 1406). The first PDCCH includes scheduling information for an uplink transmission from the UE to the wireless communications network.

The UE monitors the wireless communications network for the uplink cancellation command in accordance with the search space set (step 1408). In some implementations, the monitoring of the wireless communications network can be performed subsequent to the receipt of the first PDCCH.

The UE device receives a second PDCCH from the wireless communications network (step 1410). The second PDCCH includes the uplink cancellation command. The uplink cancellation command includes an indication to cancel a first portion of the uplink transmission.

The UE cancels a transmission of the first portion of the uplink transmission to the wireless communications network (step 1412).

In some implementations, the first PDCCH and second PDCCH can be received according to a common downlink control information (DCI) format.

In some implementations, the UE can activate a configuration of the search space set only after a reception and detection of the first PDCCH.

In some implementations, the UE can monitor the wireless communications network according to a monitoring duration indicated by the search space set, and refrain from monitoring the wireless communications network according to a monitoring periodicity indicated by the search space set.

Figure 14B:
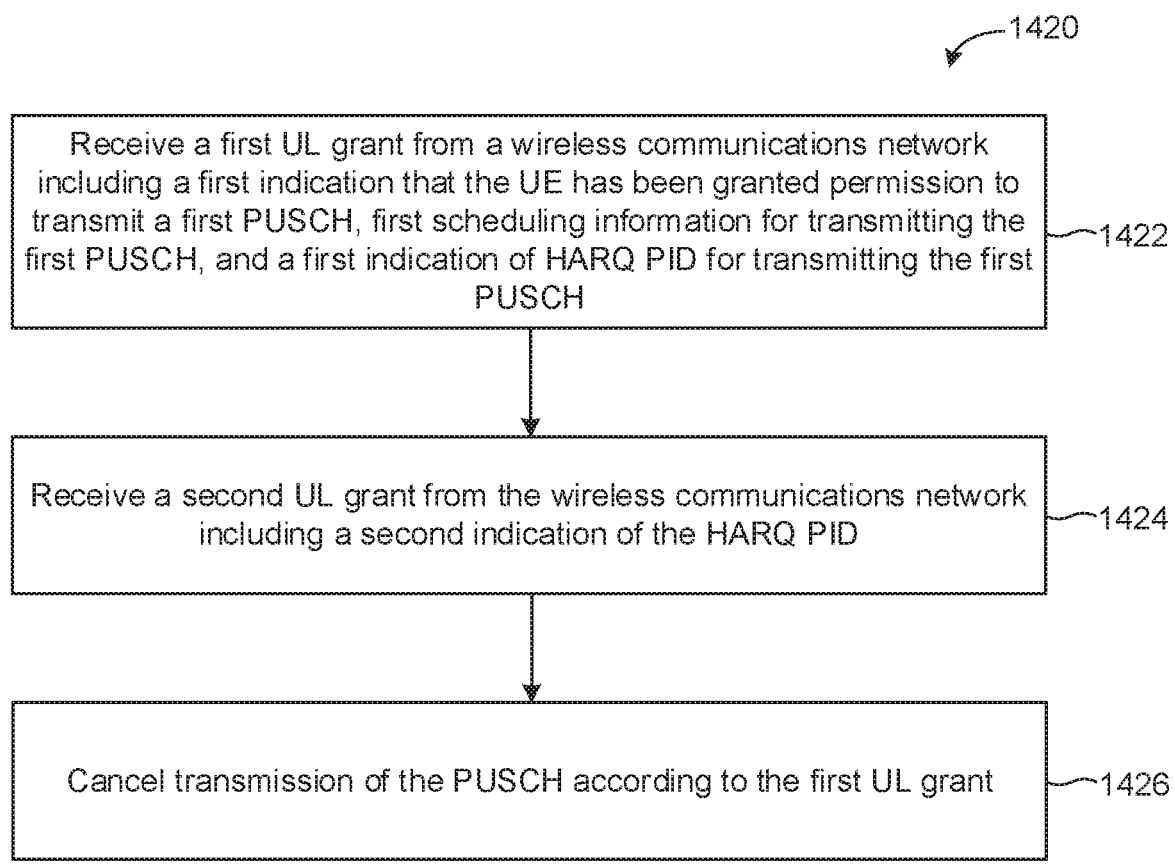

FIG. 14B is a flow chart that illustrates another example process 1420 for controlling the transmission of data on a wireless communications network. The process 1420 includes steps for execution by the electronic device(s), network(s), system(s), chip(s) or component(s), or portions or implementations thereof, of FIGS. 1-13, that may be configured to perform one or more processes, techniques, or methods as described herein, or portions thereof.

According to the process 1420, a user equipment (UE) receives a first uplink (UL) grant from a wireless communications network (step 1422). The first UL grant comprises includes a first indication that the UE has been granted permission to transmit a first physical uplink shared channel (PUSCH), first scheduling information for transmitting the first PUSCH, and a first indication of a hybrid automatic repeat request (HARQ) process identifier (PID) for transmitting the first PUSCH.

Subsequent to receiving the first UL grant, the UE receives a second UL grant from the wireless communications network (step 1424). The second UL grant includes a second indication of the HARQ PID.

Responsive to receiving the second UL, the UE cancels transmission of the PUSCH according to the first UL grant (step 1426).

In some implementations, the process 1420 can further include transmitting the first PUSCH according to the second UL grant.

In some implementations, the second UL grant can include an uplink shared channel (UL-SCH) indicator bit and a channel state information (CSI) request. A value of the UL-SCH indicator bit can be zero, and the CSI request can be a sequence of zero bits. In some implementations, based on the second UL grant, the UE can refrain from transmitting the first PSUCH according to the second UL grant.

Figure 14C:
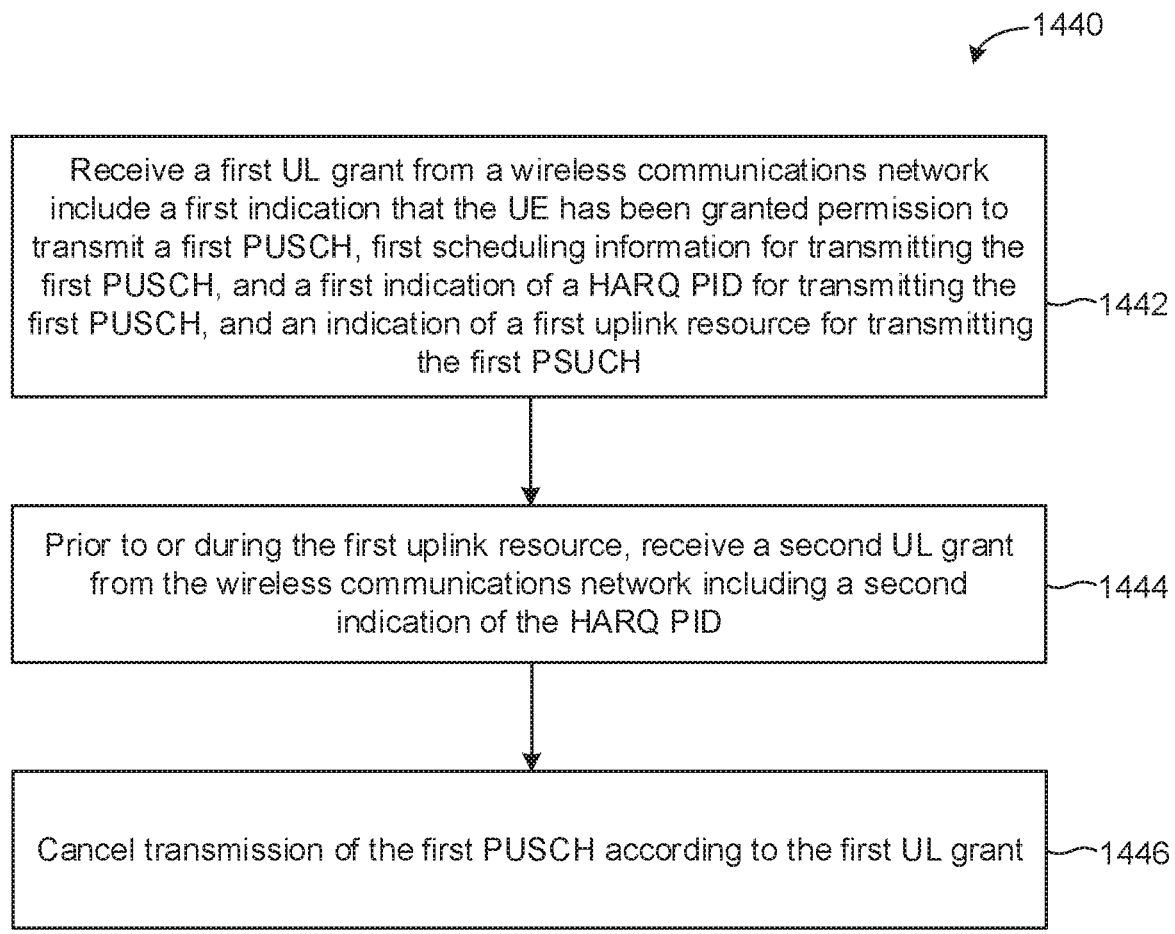

FIG. 14C is a flow chart that illustrates another example process 1440 for controlling the transmission of data on a wireless communications network. The process 1440 includes steps for execution by the electronic device(s), network(s), system(s), chip(s) or component(s), or portions or implementations thereof, of FIGS. 1-13, that may be configured to perform one or more processes, techniques, or methods as described herein, or portions thereof.

According to the process 1440, a user equipment (UE) receives a first uplink (UL) grant from a wireless communications network (step 1442). The first UL grant includes a first indication that the UE has been granted permission to transmit a first physical uplink shared channel (PUSCH), first scheduling information for transmitting the first PUSCH, a first indication of a hybrid automatic repeat request (HARQ) process identifier (PID) for transmitting the first PUSCH, and an indication of a first uplink resource for transmitting the first PSUCH.

Prior to or during the first uplink resource, the UE receives a second UL grant from the wireless communications network (step 1444). The second UL grant includes a second indication of the HARQ PID. Responsive to receiving the second UL, the UE cancels transmission of the first PUSCH according to the first UL grant (step 1446).

In some implementations, the second UL grant can also include an indication of a second uplink resource. The process 2440 can also include transmitting, by the UE, the first PUSCH using the second uplink resource.

In some implementations, the process 2440 can also include refraining from transmitting the first PSUCH according to the second UL grant.

In some implementations, first PUSCH can include HARQ feedback information associated with the HARQ PID.

In some implementations, the first uplink resource can be a Fifth Generation (5G) new radio (NR) resource in accordance with 3rd Generation Partnership Project (3GPP) technical standards.

In some implementations, the HARQ PID can be associated with a downlink transmission performing according to Fifth Generation (5G) new radio (NR) 3rd Generation Partnership Project (3GPP) technical standards.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. For purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). Other allocations of functionality are envisioned and may fall within the scope of claims that follow. Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Example implementations of the features described herein are provided below.

Example 1: A Method Includes: (i) Receiving, by a User Equipment (UE), a Configuration message from a base station of a wireless communications network, the configuration message including an indication of a search space set for monitoring the wireless communications network for an uplink cancellation message; (ii) receiving, by the UE, a first physical downlink control channel (PDCCH) from the wireless communications network, the first PDCCH including an uplink grant including scheduling information for an uplink transmission from the UE to the wireless communications network; (iii) monitoring, by the UE, the wireless communications network for the uplink cancellation message in accordance with the search space set, where the monitoring of the wireless communications network is triggered by the uplink grant and performed subsequent to the receipt of the uplink grant; (iii) receiving, by the UE, a second PDCCH from the wireless communications network, the second PDCCH including the uplink cancellation message, the uplink cancellation message including an indication to cancel at least a portion of the uplink transmission; and (iv) cancelling, by the UE, a transmission of the first portion of the uplink transmission to the wireless communications network.

Example 2: a method includes the method of Example 1. Further, the indication of the search space set includes at least one of: an indication of a duration for monitoring the PDCCH for the uplink cancellation message, an indication of a monitoring offset to a start position of the duration, an indication of a periodicity for monitoring the PDCCH for the uplink cancellation message, or an indication of a monitoring pattern.

Example 3: a method includes the method of Example 1. Further, the first PDCCH and second PDCCH are received according to a common downlink control information (DCI) format.

Example 4: a system includes: one or more processors; and memory storing instructions that when executed by the one or more processors, cause the one or more processors to perform various operations. The operations include: (i) receiving, by a user equipment (UE), a first configuration message from a base station of a wireless communications network, the first configuration message including an indication of a search space set for monitoring the wireless communications network for an uplink cancellation message; (ii) receiving, by the UE, a first physical downlink control channel (PDCCH) from the wireless communications network, the first PDCCH including an uplink grant including scheduling information for an uplink transmission from the UE to the wireless communications network; (iii) monitoring, by the UE, the wireless communications network for the uplink cancellation message in accordance with the search space set, where the monitoring of the wireless communications network is triggered by the uplink grant and performed subsequent to the receipt of the uplink grant; (iv) receiving, by the UE, a second PDCCH from the wireless communications network, the second PDCCH including the uplink cancellation message, the uplink cancellation message including an indication to cancel at least a portion of the uplink transmission; and (v) cancelling, by the UE, a transmission of the first portion of the uplink transmission to the wireless communications network.

Example 5: a system includes the system of Example 4. Further, indication of the search space set includes at least one of: an indication of a duration for monitoring the PDCCH for the uplink cancellation message, an indication of a monitoring offset to a start position of the duration, an indication of a periodicity for monitoring the PDCCH for the uplink cancellation message, or an indication of a monitoring pattern.

Example 6: a system includes the system of Example 4. Further, the first PDCCH and second PDCCH are received according to a common downlink control information (DCI) format.

Example 7: one or more non-transitory, computer-readable storage media have instructions stored thereon, that when executed by one or more processors, cause the one or more processors to perform various operations. The operations include: (i) receiving, by a user equipment (UE), a configuration message from a base station of a wireless communications network, the configuration message including an indication of a search space set for monitoring the wireless communications network for an uplink cancellation message; (ii) receiving, by the UE, a first physical downlink control channel (PDCCH) from the wireless communications network, the first PDCCH including an uplink grant including scheduling information for an uplink transmission from the UE to the wireless communications network; (iii) monitoring, by the UE, the wireless communications network for the uplink cancellation message in accordance with the search space set, where the monitoring of the wireless communications network is triggered by the uplink grant and performed subsequent to the receipt of the uplink grant; (iv) receiving, by the UE, a second PDCCH from the wireless communications network, the second PDCCH including the uplink cancellation message, the uplink cancellation message including an indication to cancel at least a portion of the uplink transmission; and (v) cancelling, by the UE, a transmission of the first portion of the uplink transmission to the wireless communications network.

Example 8: one or more non-transitory, computer-readable storage media include the one or more non-transitory, computer-readable storage media of Example 7. Further, the indication of the search space set includes at least one of: an indication of a duration for monitoring the PDCCH for the uplink cancellation message, an indication of a monitoring offset to a start position of the duration, an indication of a periodicity for monitoring the PDCCH for the uplink cancellation message, or an indication of a monitoring pattern.

Example 9: one or more non-transitory, computer-readable storage media include the one or more non-transitory, computer-readable storage media of Example 7. Further, the first PDCCH and second PDCCH are received according to a common downlink control information (DCI) format.

Example 10: a method includes (i) receiving, by a user equipment (UE), a first uplink (UL) grant from a wireless communications network, where the first UL grant includes: a first indication that the UE has been granted permission to transmit a first physical uplink shared channel (PUSCH), first scheduling information for transmitting the first PUSCH, and a first indication of a hybrid automatic repeat request (HARQ) process identifier (PID) for transmitting the first PUSCH; (ii) subsequent to receiving the first UL grant, receiving, by the UE, a second UL grant from the wireless communications network, where the second UL grant includes a second indication of the HARQ PID; and (iii) responsive to receiving the second UL, cancelling, by the UE, transmission of the PUSCH according to the first UL grant.

Example 11: a method includes the method of Example 10. Further, the method includes transmitting the first PUSCH according to the second UL grant.

Example 12: a method includes the method of Example 10. Further, the second UL grant includes an uplink shared channel (UL-SCH) indicator bit and a channel state information (CSI) request, where a value of the UL-SCH indicator bit is zero, and where the CSI request is a sequence of zero bits.

Example 13: a method includes the method of Example 12. Further, the UE refrains from transmitting the first PSUCH according to the second UL grant.

Example 14: a system includes: one or more processors; and memory storing instructions that when executed by the one or more processors, cause the one or more processors to perform various operations. The operations include: (i) receiving, by a user equipment (UE), a first uplink (UL) grant from a wireless communications network, where the first UL grant includes: a first indication that the UE has been granted permission to transmit a first physical uplink shared channel (PUSCH), first scheduling information for transmitting the first PUSCH, and a first indication of a hybrid automatic repeat request (HARQ) process identifier (PID) for transmitting the first PUSCH; (ii) subsequent to receiving the first UL grant, receiving, by the UE, a second UL grant from the wireless communications network, where the second UL grant includes a second indication of the HARQ PID; and (iii) responsive to receiving the second UL, cancelling, by the UE, transmission of the PUSCH according to the first UL grant.

Example 15: a system includes the system of Example 14. Further, the operations include transmitting the first PUSCH according to the second UL grant.

Example 16: a system includes the system of Example 14. Further, the second UL grant includes an uplink shared channel (UL-SCH) indicator bit and a channel state information (CSI) request, where a value of the UL-SCH indicator bit is zero, and where the CSI request is a sequence of zero bits.

Example 17: a system includes the system of Example 16. Further, the UE refrains from transmitting the first PSUCH according to the second UL grant.

Example 18: one or more non-transitory, computer-readable storage media have instructions stored thereon, that when executed by one or more processors, cause the one or more processors to perform various operations. The operations include: (i) receiving, by a user equipment (UE), a first uplink (UL) grant from a wireless communications network, where the first UL grant includes: a first indication that the UE has been granted permission to transmit a first physical uplink shared channel (PUSCH), first scheduling information for transmitting the first PUSCH, and a first indication of a hybrid automatic repeat request (HARQ) process identifier (PID) for transmitting the first PUSCH; (ii) subsequent to receiving the first UL grant, receiving, by the UE, a second UL grant from the wireless communications network, where the second UL grant includes a second indication of the HARQ PID; and (iii) responsive to receiving the second UL, cancelling, by the UE, transmission of the PUSCH according to the first UL grant.

Example 19: one or more non-transitory, computer-readable storage media include the one or more non-transitory, computer-readable storage media of Example 18. Further, the operations also include transmitting the first PUSCH according to the second UL grant.

Example 20: one or more non-transitory, computer-readable storage media include the one or more non-transitory, computer-readable storage media of Example 18. Further, the second UL grant includes an uplink shared channel (UL-SCH) indicator bit and a channel state information (CSI) request, where a value of the UL-SCH indicator bit is zero, and where the CSI request is a sequence of zero bits.

Example 21: one or more non-transitory, computer-readable storage media include the one or more non-transitory, computer-readable storage media of Example 20. Further, the UE refrains from transmitting the first PSUCH according to the second UL grant.

Example 22: A method includes (i) receiving, by a user equipment (UE), a first uplink (UL) grant from a wireless communications network, where the first UL grant include: a first indication that the UE has been granted permission to transmit a first physical uplink shared channel (PUSCH), first scheduling information for transmitting the first PUSCH, a first indication of a hybrid automatic repeat request (HARQ) process identifier (PID) for transmitting the first PUSCH, and an indication of a first uplink resource for transmitting the first PSUCH; (ii) prior to or during the first uplink resource, receiving, by the UE, a second UL grant from the wireless communications network, where the second UL grant includes a second indication of the HARQ PID; and (iii) responsive to receiving the second UL, cancelling, by the UE, transmission of the first PUSCH according to the first UL grant.

Example 23: a method includes the method of Example 22. Further, the second UL grant further includes an indication of a second uplink resource, and the method further includes transmitting, by the UE, the first PUSCH using the second uplink resource.

Example 24: a method includes the method of Example 22. Further, the method also includes refraining from transmitting the first PSUCH according to the second UL grant.

Example 25: a method includes the method of Example 22. Further, the first PUSCH includes HARQ feedback information associated with the HARQ PID.

Example 26: a method includes the method of Example 22. Further, the HARQ PID is associated with a downlink transmission.

Example 27: a system includes: one or more processors; and memory storing instructions that when executed by the one or more processors, cause the one or more processors to perform various operations. The operations include: (i) receiving, by a user equipment (UE), a first uplink (UL) grant from a wireless communications network, where the first UL grant includes: a first indication that the UE has been granted permission to transmit a first physical uplink shared channel (PUSCH), first scheduling information for transmitting the first PUSCH, a first indication of a hybrid automatic repeat request (HARQ) process identifier (PID) for transmitting the first PUSCH, and an indication of a first uplink resource for transmitting the first PSUCH; (ii) prior to or during the first uplink resource, receiving, by the UE, a second UL grant from the wireless communications network, where the second UL grant includes a second indication of the HARQ PID; and (iii) responsive to receiving the second UL, cancelling, by the UE, transmission of the first PUSCH according to the first UL grant.

Example 28: a system includes the system of Example 27. Further, the second UL grant further includes an indication of a second uplink resource, and the operations further include transmitting, by the UE, the first PUSCH using the second uplink resource.

Example 29: a system includes the system of Example 27. Further, the method also includes refraining from transmitting the first PSUCH according to the second UL grant.

Example 30: a system includes the system of Example 27. Further, the first PUSCH includes HARQ feedback information associated with the HARQ PID.

Example 31: a system includes the system of Example 27. Further, the HARQ PID is associated with a downlink transmission.

Example 32: one or more non-transitory, computer-readable storage media have instructions stored thereon, that when executed by one or more processors, cause the one or more processors to perform various operations. The operations include: (i) receiving, by a user equipment (UE), a first uplink (UL) grant from a wireless communications network, where the first UL grant includes: a first indication that the UE has been granted permission to transmit a first physical uplink shared channel (PUSCH), first scheduling information for transmitting the first PUSCH, a first indication of a hybrid automatic repeat request (HARQ) process identifier (PID) for transmitting the first PUSCH, and an indication of a first uplink resource for transmitting the first PSUCH; (ii) prior to or during the first uplink resource, receiving, by the UE, a second UL grant from the wireless communications network, where the second UL grant includes a second indication of the HARQ PID; and (iii) responsive to receiving the second UL, cancelling, by the UE, transmission of the first PUSCH according to the first UL grant.

Example 33: one or more non-transitory, computer-readable storage media include the one or more non-transitory, computer-readable storage media of Example 32. Further, the second UL grant further includes an indication of a second uplink resource, and the operations further include transmitting, by the UE, the first PUSCH using the second uplink resource.

Example 34: one or more non-transitory, computer-readable storage media include the one or more non-transitory, computer-readable storage media of Example 32. Further, the operations also include refraining from transmitting the first PSUCH according to the second UL grant.

Example 35: one or more non-transitory, computer-readable storage media include the one or more non-transitory, computer-readable storage media of Example 32. Further, the first PUSCH includes HARQ feedback information associated with the HARQ PID.

Example 36: one or more non-transitory, computer-readable storage media include the one or more non-transitory, computer-readable storage media of Example 32. Further, the HARQ PID is associated with a downlink transmission.

Example 37: a method includes the method of Example 1. Further, the uplink transmission is one of a physical random access channel (PRACH) or a sounding reference signal (SRS).

Example 38: a method includes the method of Example 1. Further, the indication of the search space set includes an indication of an offset value between a beginning of the search space set and a reference point.

Example 39: a method includes the method of Example 38. Further, the reference point is a beginning or an end of a control resource set (CORESET) in which the uplink grant was received.

Example 40: a method includes the method of Example 38. Further, the offset value is a number of symbols.

Example 41: a method includes the method of Example 38. Further, the offset value is a number of slots.

Example 42: a method includes the method of Example 1. Further, the search space includes a plurality of periodically repeating monitoring occasions.

Example 43: a method includes the method of Example 42. Further, an offset between two adjacent ones of the monitoring occasions depends on a time gap between an end of the uplink grant and an end of the uplink transmission indicated by the scheduling information.

Example 44: a method includes the method of Example 42. Further, an offset between two adjacent ones of the monitoring occasions depends on a duration of the uplink transmission indicated by the scheduling information.

Example 45: a system includes the system of Example 4. Further, the uplink transmission is one of a physical random access channel (PRACH) or a sounding reference signal (SRS).

Example 46: a system includes the system of Example 4. Further, the indication of the search space set includes an indication of an offset value between a beginning of the search space set and a reference point.

Example 47: a system includes the system of Example 46. Further, the reference point is a beginning or an end of a control resource set (CORESET) in which the uplink grant was received.

Example 48: a system includes the system of Example 46. Further, the offset value is a number of symbols.

Example 49: a system includes the system of Example 46. Further, the offset value is a number of slots.

Example 50: a system includes the system of Example 4. Further, the search space includes a plurality of periodically repeating monitoring occasions.

Example 51: a system includes the system of Example 50. Further, an offset between two adjacent ones of the monitoring occasions depends on a time gap between an end of the uplink grant and an end of the uplink transmission indicated by the scheduling information.

Example 52: a system includes the system of Example 50. Further, an offset between two adjacent ones of the monitoring occasions depends on a duration of the uplink transmission indicated by the scheduling information.

Example 53: one or more non-transitory, computer-readable storage media include the one or more non-transitory, computer-readable storage media of Example 7. Further, the uplink transmission is one of a physical random access channel (PRACH) or a sounding reference signal (SRS).

Example 54: one or more non-transitory, computer-readable storage media include the one or more non-transitory, computer-readable storage media of Example 7. Further, the indication of the search space set includes an indication of an offset value between a beginning of the search space set and a reference point.

Example 55: one or more non-transitory, computer-readable storage media include the one or more non-transitory, computer-readable storage media of Example 54. Further, the reference point is a beginning or an end of a control resource set (CORESET) in which the uplink grant was received.

Example 56: one or more non-transitory, computer-readable storage media include the one or more non-transitory, computer-readable storage media of Example 54. Further, the offset value is a length of time.

Example 57: one or more non-transitory, computer-readable storage media include the one or more non-transitory, computer-readable storage media of Example 54. Further, the offset value is a number of slots.

Example 58: one or more non-transitory, computer-readable storage media include the one or more non-transitory, computer-readable storage media of Example 7. Further, the search space includes a plurality of periodically repeating monitoring occasions.

Example 59: one or more non-transitory, computer-readable storage media include the one or more non-transitory, computer-readable storage media of Example 58. Further, an offset between two adjacent ones of the monitoring occasions depends on a time gap between an end of the uplink grant and an end of the uplink transmission indicated by the scheduling information.

Example 60: one or more non-transitory, computer-readable storage media include the one or more non-transitory, computer-readable storage media of Example 58. Further, an offset between two adjacent ones of the monitoring occasions depends on a duration of the uplink transmission indicated by the scheduling information.

Example 61: a method includes (i) transmitting, by a base station of a wireless communications network to a user equipment (UE), a configuration message including an indication of a search space set for monitoring the wireless communications network for an uplink cancellation message; (ii) transmitting, by the base station to the UE, a first physical downlink control channel (PDCCH), the first PDCCH including an uplink grant including scheduling information for an uplink transmission from the UE to the wireless communications network, and where the uplink grant triggers the UE to monitor the wireless communications network for the uplink cancellation message in accordance with the search space set; and (iii) transmitting, by the base station to the UE, a second PDCCH from the wireless communications network, the second PDCCH including the uplink cancellation message, the uplink cancellation message including an indication to cancel at least a portion of the uplink transmission.

Example 62: a method includes the method of Example 61. Further, the indication of the search space set includes at least one of: an indication of a duration for monitoring the PDCCH for the uplink cancellation message, an indication of a monitoring offset to a start position of the duration, an indication of a periodicity for monitoring the PDCCH for the uplink cancellation message, or an indication of a monitoring pattern.

Example 63: a method includes the method of Example 61. Further, the first PDCCH and second PDCCH are received according to a common downlink control information (DCI) format.

Example 64: a system includes: one or more processors; and memory storing instructions that when executed by the one or more processors, cause the one or more processors to perform various operations. The operations includes: (i) transmitting, by a base station of a wireless communications network to a user equipment (UE), a configuration message including an indication of a search space set for monitoring the wireless communications network for an uplink cancellation message; (ii) transmitting, by the base station to the UE, a first physical downlink control channel (PDCCH), the first PDCCH including an uplink grant including scheduling information for an uplink transmission from the UE to the wireless communications network, and where the uplink grant triggers the UE to monitor the wireless communications network for the uplink cancellation message in accordance with the search space set; and (iii) transmitting, by the base station to the UE, a second PDCCH from the wireless communications network, the second PDCCH including the uplink cancellation message, the uplink cancellation message including an indication to cancel at least a portion of the uplink transmission.

Example 65: a system includes the system of Example 64. Further, the indication of the search space set includes at least one of: an indication of a duration for monitoring the PDCCH for the uplink cancellation message, an indication of a monitoring offset to a start position of the duration, an indication of a periodicity for monitoring the PDCCH for the uplink cancellation message, or an indication of a monitoring pattern.

Example 66: a system includes the system of Example 64. Further, the first PDCCH and second PDCCH are received according to a common downlink control information (DCI) format.

What is claimed is:

1. A baseband processor comprising:
one or more processors; and
memory storing instructions that when executed by the one or more processors, cause the one or more processors to perform operations comprising:
receiving a first configuration message from a base station of a wireless communications network, the first configuration message representing a search space set for monitoring the wireless communications network for an uplink cancellation message, wherein the search space set comprises a plurality of periodically repeating monitoring occasions;
receiving a first physical downlink control channel (PDCCH) from the wireless communications network, the first PDCCH comprising an uplink grant including scheduling information for an uplink transmission to the wireless communications network;
determining the search space set by determining an offset parameter between two adjacent ones of the periodically repeating monitoring occasions based on at least one of:
a time gap between an end of the uplink grant and an end of the uplink transmission indicated by the scheduling information, or a duration of the uplink transmission indicated by the scheduling information;

monitoring the wireless communications network for the uplink cancellation message in accordance with the search space set, wherein the monitoring of the wireless communications network is triggered by the uplink grant and performed subsequent to the receipt of the uplink grant;

receiving a second PDCCH from the wireless communications network, the second PDCCH comprising the uplink cancellation message, the uplink cancellation message comprising an indication to cancel at least a portion of the uplink transmission; and cancelling a transmission of at least the portion of the uplink transmission to the wireless communications network.

2. The baseband processor of claim 1, wherein the first configuration message comprises at least one of:
an indication of a duration for monitoring the PDCCH for the uplink cancellation message,
an indication of a monitoring offset to a start position of the duration, or
an indication of a monitoring pattern.

3. The baseband processor of claim 1, wherein the first PDCCH and second PDCCH are received according to a common downlink control information (DCI) format.

4. The baseband processor of claim 1, wherein the uplink transmission is one of a physical random access channel (PRACH) or a sounding reference signal (SRS).

5. The baseband processor of claim 1, wherein the first configuration message comprises an indication of an offset value between a beginning of the search space set and a reference point.

6. The baseband processor of claim 5, wherein the reference point is a beginning or an end of a control resource set (CORESET) in which the uplink grant was received.

7. The baseband processor of claim 5, wherein the offset value between the beginning of the search space set and the reference point is a number of symbols.

8. The baseband processor of claim 5, wherein the offset value between the beginning of the search space set and the reference point is a number of slots.

9. The baseband processor of claim 1, wherein a periodicity of the periodically repeating monitoring occasions is determined implicitly based on at least one of:
the time gap between the end of the uplink grant and the end of the uplink transmission indicated by the scheduling information, or
the duration of the uplink transmission indicated by the scheduling information.

10. An apparatus comprising:
one or more processors; and
memory storing instructions that when executed by the one or more processors, cause the one or more processors to perform operations comprising:
transmitting, to a user equipment (UE), a configuration message representing a search space set for monitoring a wireless communications network for an uplink cancellation message, wherein the search space set comprises a plurality of periodically repeating monitoring occasions;
transmitting, to the UE, a first physical downlink control channel (PDCCH), the first PDCCH comprising an uplink grant including scheduling information for an uplink transmission from the UE to the wireless communications network, and wherein the uplink grant triggers the UE to monitor the wireless communications network for the uplink cancellation message in accordance with the search space set;

causing the UE to determine the search space set by determining an offset parameter between two adjacent ones of the periodically repeating monitoring occasions based on at least one of:
a time gap between an end of the uplink grant and an end of the uplink transmission indicated by the scheduling information, or
a duration of the uplink transmission indicated by the scheduling information; and
transmitting, to the UE, a second PDCCH from the wireless communications network, the second PDCCH comprising the uplink cancellation message, the uplink cancellation message comprising an indication to cancel at least a portion of the uplink transmission.

11. The apparatus of claim 10, wherein the configuration message comprises at least one of:
an indication of a duration for monitoring the PDCCH for the uplink cancellation message,
an indication of a monitoring offset to a start position of the duration, or
an indication of a monitoring pattern.

12. The apparatus of claim 10, wherein the first PDCCH and second PDCCH are received according to a common downlink control information (DCI) format.

13. A method comprising:
receiving a first configuration message from a base station of a wireless communications network, the first configuration message representing a search space set for monitoring the wireless communications network for an uplink cancellation message, wherein the search space set comprises a plurality of periodically repeating monitoring occasions;

receiving a first physical downlink control channel (PDCCH) from the wireless communications network, the first PDCCH comprising an uplink grant including scheduling information for an uplink transmission from a user equipment (UE) to the wireless communications network;

determining the search space set by determining an offset parameter between two adjacent ones of the periodically repeating monitoring occasions based on at least one of:
a time gap between an end of the uplink grant and an end of the uplink transmission indicated by the scheduling information, or
a duration of the uplink transmission indicated by the scheduling information;

monitoring the wireless communications network for the uplink cancellation message in accordance with the search space set, wherein the monitoring of the wireless communications network is triggered by the uplink grant and performed subsequent to the receipt of the uplink grant;

receiving a second PDCCH from the wireless communications network, the second PDCCH comprising the uplink cancellation message, the uplink cancellation message comprising an indication to cancel at least a portion of the uplink transmission; and canceling a transmission of at least the portion of the uplink transmission to the wireless communications network.

14. The method of claim 13, wherein the first configuration message comprises at least one of:

an indication of a duration for monitoring the PDCCH for the uplink cancellation message, an indication of a monitoring offset to a start position of the duration, or an indication of a monitoring pattern.

15. The method of claim 13, wherein the first PDCCH and second PDCCH are received according to a common downlink control information (DCI) format.

16. The method of claim 13, wherein the uplink transmission is one of a physical random access channel (PRACH) or a sounding reference signal (SRS).

17. The method of claim 13, wherein the first configuration message comprises an indication of an offset value between a beginning of the search space set and a reference point.

* * * * *